(12) United States Patent
Lefebvre et al.

(10) Patent No.: US 7,817,160 B2
(45) Date of Patent: Oct. 19, 2010

(54) SUB-PASS CORRECTION USING NEIGHBORHOOD MATCHING

(75) Inventors: Sylvain Lefebvre, Bellevue, WA (US); Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 11/172,594

(22) Filed: Jun. 30, 2005

(65) Prior Publication Data

US 2007/0002070 A1    Jan. 4, 2007

(51) Int. Cl.
G09G 5/00 (2006.01)
G09G 5/10 (2006.01)
G06K 9/36 (2006.01)

(52) U.S. Cl. .................. 345/582; 345/660; 345/694; 382/276

(58) Field of Classification Search ............ 245/582, 245/629, 660, 694; 382/203, 239, 284, 294, 382/276

See application file for complete search history.

(56) References Cited

U.S. PATENT DOCUMENTS

| | | | |
|---|---|---|---|
| 5,459,586 A * | 10/1995 | Nagasato et al. ............ 358/450 |
| 5,740,277 A | 4/1998 | Katto |
| 5,774,129 A | 6/1998 | Poggio et al. |
| 5,784,498 A | 7/1998 | Venable |
| 5,872,867 A | 2/1999 | Bergen |
| 6,075,905 A * | 6/2000 | Herman et al. ............ 382/284 |
| 6,392,655 B1 | 5/2002 | Migdal |
| 6,525,744 B1 | 2/2003 | Poggio et al. |
| 6,593,933 B1 | 7/2003 | Xu |
| 6,700,585 B2 | 3/2004 | Ritter |
| 6,756,989 B1 * | 6/2004 | Morgan et al. ............ 345/582 |

(Continued)

FOREIGN PATENT DOCUMENTS

JP    9044655    2/1997

(Continued)

OTHER PUBLICATIONS

Adelson, E. H., C. H. Anderson, J. R. Bergen, P. J. Burt and J. M. Ogden, Pyramid methods in image processing, *RCA Engineer*, Nov./Dec. 1984, vol. 29, No. 6, pp. 33-41.

(Continued)

*Primary Examiner*—Amare Mengistu
*Assistant Examiner*—Aaron M Guertin
(74) *Attorney, Agent, or Firm*—Lyon & Harr, L.L.P.; Craig S. Fischer

(57) ABSTRACT

A method and system for synthesizing texture using a preprocessed exemplar image and a neighborhood-matching per-pixel texture synthesis correction technique. The sub-pass correction system and method alters pixel coordinates to recreate neighborhoods similar to those in the exemplar image. In the context of parallel texture synthesis, instead of synthesizing all pixels of an image simultaneously, the sub-pass correction system and method allows neighbors to be corrected in different sub-passes. Each pixel, therefore, benefits from the correction of some of its neighbors in previous sub-passes. This reduces the required number of global correction passes to obtain good synthesis results Generally, one or more correction passes are performed, with each correction pass divided into a plurality of correction sub-passes. A number of pixel coordinates are corrected in parallel during each of the correction sub-passes.

14 Claims, 25 Drawing Sheets

U.S. PATENT DOCUMENTS

| | | | |
|---|---|---|---|
| 6,762,769 | B2 | 7/2004 | Guo |
| 6,888,544 | B2 | 5/2005 | Malzbender et al. |
| 6,965,694 | B2 | 11/2005 | Ueda et al. |
| 6,999,095 | B2 | 2/2006 | Wang et al. |
| 7,002,591 | B1 | 2/2006 | Leather et al. |
| 2002/0122043 | A1* | 9/2002 | Freeman et al. ............ 345/582 |
| 2002/0158888 | A1* | 10/2002 | Kitsutaka .................... 345/629 |
| 2002/0171660 | A1* | 11/2002 | Luo et al. ................... 345/582 |
| 2003/0164838 | A1* | 9/2003 | Guo et al. ................... 345/582 |
| 2003/0179923 | A1 | 9/2003 | Xiong |
| 2003/0189579 | A1* | 10/2003 | Pope .......................... 345/660 |
| 2003/0206176 | A1* | 11/2003 | Ritter ......................... 345/582 |
| 2004/0042673 | A1* | 3/2004 | Boon .......................... 382/239 |
| 2004/0075666 | A1 | 4/2004 | Ritter |
| 2004/0096120 | A1 | 5/2004 | Tong |
| 2004/0165787 | A1* | 8/2004 | Perez et al. ................. 382/284 |
| 2004/0233211 | A1 | 11/2004 | Wang |
| 2004/0234159 | A1 | 11/2004 | Wang |
| 2005/0013509 | A1 | 1/2005 | Samadani |
| 2005/0093894 | A1* | 5/2005 | Tretter et al. ............... 345/694 |
| 2005/0253863 | A1 | 11/2005 | Mitchell et al. |
| 2006/0001679 | A1 | 1/2006 | Hamburg |
| 2006/0028481 | A1 | 2/2006 | Zhang et al. |

FOREIGN PATENT DOCUMENTS

| | | |
|---|---|---|
| WO | WO 2004055724 | 1/2004 |

OTHER PUBLICATIONS

Ashikhmin, M., Synthesizing natural textures, *Symposium on Interactive 3D Graphics*, pp. 217-226.

Bar-Joseph, Z., El-Yaniv, R., Lischinski, D., and Werman, M. 2001, Texture mixing and texture movie synthesis using statistical learning, *IEEE TVCG*, vol. 7 No. 2, pp. 120-135.

Burt, P. J., E. Adelson, The Laplacian Pyramid as a compact image code, *IEEE Transactions on Communications*, Apr. 1983, vol. com-31 No. 4, pp. 532-540.

Cohen, M., J. Shade, S. Hiller, and O. Deussen, 2003, Wang tiles for image and texture generation, *ACM SIGGRAPH*, pp. 287-294.

De Bonet, J., Multiresolution sampling procedure for analysis and synthesis of texture images, *ACM SIGGRAPH*, pp. 341-346.

Garber, D., *Computational Models for Texture Analysis and Texture Synthesis*. PhD thesis, University of Southern California, 1981.

Kwatra, V., A. Schödl, I. Essa, G. Turk, and A. Bobick, Graphcut textures: Image and video synthesis using graph cuts, *ACM SIGGRAPH*, 2003, pp. 277-286.

Lefebvre, S., and F. Neyret, Pattern based procedural textures, *Symposium and Interactive 3D Graphics*, 2003, pp. 203-212.

Liang, L., C. Liu, Y. Xu, B. Guo, and H.-Y. Shum, Real-time texture synthesis by patch-based sampling, 2001, *ACM TOG*, vol. 20, No. 3, 127-150.

Liu, Y., W.-C. Lin, and J. Hays, Near-regular texture analysis and manipulation, *ACM SIGGRAPH*, 2004, pp. 368-376.

Liu, Y., Y. Tsin, and W.-C. Lin, The promise and peril of near-regular texture, *IJCV*, vol. 62, No. 1-2, pp. 149-159.

Tanner, C., C. Migdal, and M. Jones, The clipmap: A virtual mipmap, *ACM SIGGRAPH*, 1998, pp. 151-158.

Tong, X., J. Zhang, L. Liu, X. Wang, B. Guo and H.-Y. Shum, Synthesis of bidirectional texture functions on arbitrary surfaces, 2002, *ACM SIGGRAPH*, pp. 665-672.

Tonietto, L., and M. Walter, Towards local control for image-based texture synthesis, *Proceedings of the 15th Brazilian Symposium on Comp. Graphics and Image Processing SIBGRAPHI*, 2002, pp. 252-258.

Wei, L.-Y. and M. Levoy, Fast texture synthesis using tree-structured vector quantization, *ACM SIGGRAPH*, 2000, pp. 479-488.

Wei, L.-Y. and M. Levoy, Order-independent texture synthesis, http://graphics.stanford.edu/papers/texture-synthesis-sig03/, Rejected from *SIGGRAPH* 2003.

Wei, L.-Y., Tile-based texture mapping on graphics hardware, *Graphics Hardware*, 2004, pp. 55-64.

Zalesny, A., V. Ferrari, G. Caenen, and L. Van Gool, Composite texture synthesis, *IJCV*, 2005, vol. 62, No. 1-2, pp. 161-176.

Zhang, J., K. Zhou, L. Velho, B. Guo, and H.-Y. Shum, Synthesis of progressively-variant textures on arbitrary surfaces, 2003, *ACM SIGGRAPH*, pp. 295-302.

Co-pending U.S. Appl. No. 11/172,593, Parallel texture synthesis having controllable jitter, filed Jun. 30, 2005.

Co-pending U.S. Appl. No. 11/174,231, Parallel texture synthesis by unsampling pixel coordinates controllable jitter, filed Jun. 30, 2005.

Co-pending U.S. Appl. No. 11/171,920, Multi-level image stack of filtered images, filed Jun. 30, 2005.

Co-pending U.S. Appl. No. 11/171,923, Magnification of indirection textures, filed Jun. 30, 2005.

Cula, O.G. and K. J. Dana, Recognition Methods for 3D Textured Surfaces, available at http://www.ece.rutgers.edu/~kdana/research/spie01.pdf.

Efros, A., and T. Leung, Texture synthesis by non-parametric sampling, ICCV, 1999, pp. 1033-1038.

Fatahalian, K., Real-Time Global Illumination of Deformable Objects, available at: http://graphics.stanford.edu/~kayvonf/papers/seniorthesis03.pdf.

Gralewski, L., N. Campbell, Statistical synthesis of facial expressions for the portrayal of emotion available at http://delively.acm.org/10.1145/990000/988867/p190-gralewski.pdf?key1=988867&key2=9951194411&coll= GUIDE&dl=GUIDE&CFID=69372413& CFTOKEN=85977336.

Hertzmann, A., C. Jacobs, N. Oliver, B. Curless and D. Salesin, Image analogies, ACM SIGGRAPH, 2001, pp. 327-340.

Hertzmann, A., and D. Zorin, Illustrating smooth surfaces, ACM SIGGRAPH, 2000, pp. 517-526.

Kwatra, V., I. Essa, A. Bobick, and N. Kwatra, Texture optimization for example-based synthesis, ACM SIGGRAPH, 2005, pp. 795-802.

Lai, V.-K., S.-M. Hu, D. Gu, and R. Martin, Geometric texture synthesis and transfer via geometry images, Proc. of SMA, 2005, pp. 15-26.

Lefebvre, S., and H. Hoppe, Parallel controllable texture synthesis, ACM SIGGRAPH, 2005, pp. 777-786.

Leung, T., and Malik, J., Representing and recognizing the visual appearance of materials using three-dimensional textons, IJCV, vol. 43, No. 1, 2001, pp. 29-44.

Magda, S., and D. Kriegman, Fast texture synthesis on arbitrary meshes, Eurographics Symposium on Rendering, 2003, pp. 82-89.

Malik, J., S. Belongie, J. Shi, and T. Leung, Textons, contours and regions: Cue integration in image segmentation, ICCV, 1999, pp. 918-925.

Neyret, F., and M.-P. Cani, Pattern-based texturing revisited, ACM SIGGRAPH, 1999, pp. 235-242.

Neyret, F., Advected textures, Symposium on computer animation, 2003, pp. 147-153.

Popat, K., and Picard, R., Novel cluster-based probability model for texture synthesis, classification, and compression, Visual Communications and Image Processing, 1993, pp. 756-768.

Praun, E., A. Finkelstein, and H. Hoppe, Lapped textures, ACM SIGGRAPH, 2000, pp. 465-470.

Roweis, S., EM algorithms for PCA and SPCA, NIPS, 1997, pp. 626-632.

Roweis, S., and L. Saul, Nonlinear dimensionality reduction by locally linear embedding, Science, 2000, vol. 290, pp. 2323-2326.

Sloan, P.-P., Liu, X., , H.-Y. Shum and J. Snyder, Bi-scale radiance transfer, ACM SIGGRAPH, 2003, pp. 370-375.

Soler, C., M.-P. Cani, and A. Angelidis, Hierarchical pattern mapping, ACM SIGGRAPH, 2002, pp. 673-680.

Tenenbaum, J., V. de Silva, and J. Langford, A global geometric framework for nonlinear dimensionality reduction, Science, 2000, vol. 290, pp. 2319-2323.

Turk, G., Texture synthesis on surfaces, ACM SIGGRAPH, 2001, pp. 347-354.

Turk, G., Generating textures on arbitrary surfaces using reaction-diffusion, Proceedings of the 18th Annual Conf. on Comp. Graphics and Interactive Techniques, 1991, pp. 289-298.

Wang, L., X. Gu, K. Mueller and S.-T. Yau, Uniform texture synthesis and texture mapping using global parameterization, J. The Visual Comp., pp. 801-810.

Wei, L.-Y., and M. Levoy, Texture synthesis over arbitrary manifold surfaces, ACM SIGGRAPH, 2001, pp. 355-360.

Wu, Q., and Y. Yu, Feature matching and deformation for texture synthesis, ACM SIGGRAPH, 2004, pp. 362-365.

Ying, L., A. Hertzmann, H. Biermann, and D. Zorin, Texture and shape synthesis on surfaces, Eurographics Workshop on Rendering, 2001, pp. 301-312.

Wesner Sajous, Office Action, U.S. Appl. No. 11/171,923, Mailed Aug. 24, 2007.

Aaron M. Guertin, Office Action, U.S. Appl. No. 11/172,593, Mailed Sep. 13, 2007.

Stephen R. Koziol, Office Action, U.S. Appl. No. 11/171,920, Mailed Sep. 19, 2007.

Co-pending U.S. Appl. No. 11/428,311, Anisometric texture synthesis, filed Jun. 30, 2006.

Co-pending U.S. Appl. No. 11/426,564 Texture synthesis using dimensionality-reduced appearance space, filed Jun. 26, 2006.

Co-pending U.S. Appl. No. 11/428,355, Synthesis of advecting texture using adaptive regeneration, filed Jun. 30, 2006.

* cited by examiner

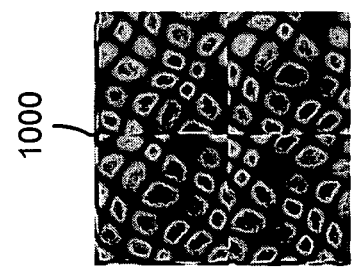
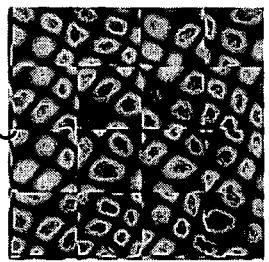
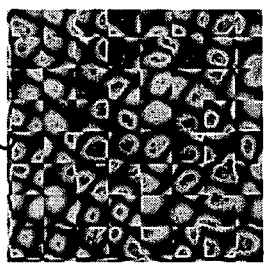
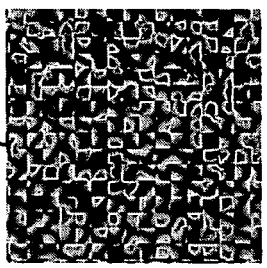
FIG. 10

LEGEND

R → RED
G → GREEN
B → BLUE
Y → YELLOW

Sub-Pass 1 (R)
Sub-Pass 2 (G)
Sub-Pass 3 (B)
Sub-Pass 4 (Y)

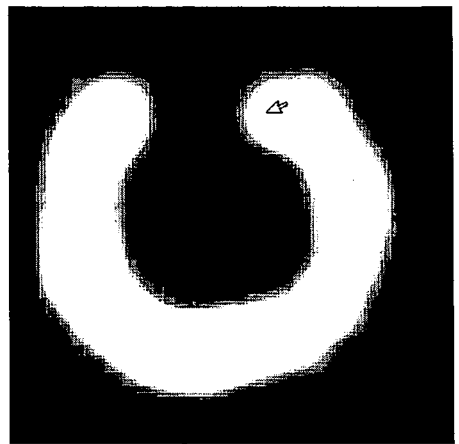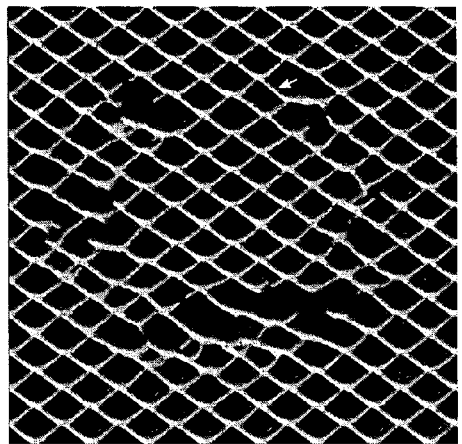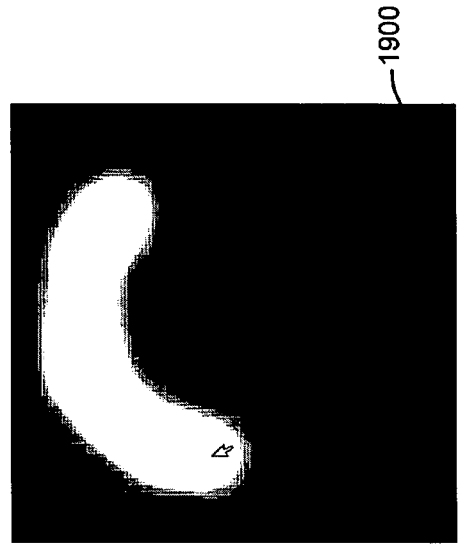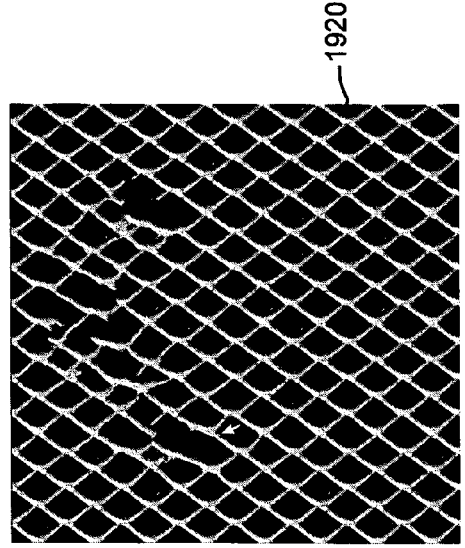
FIG. 19

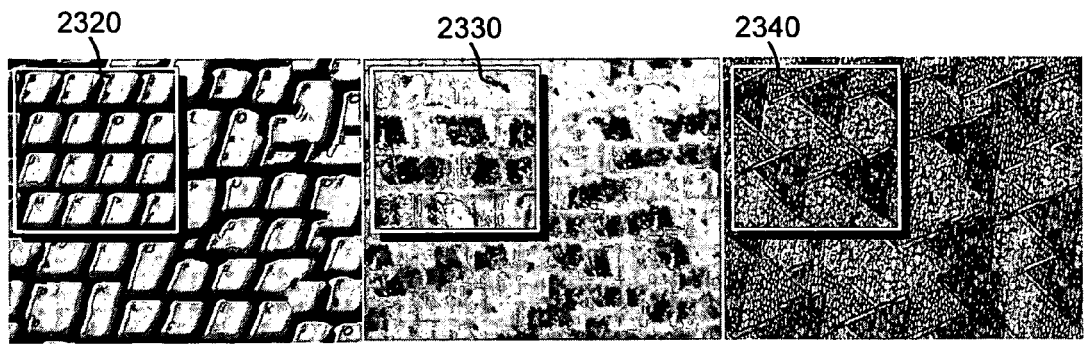
Exemplars and ordinary jitter
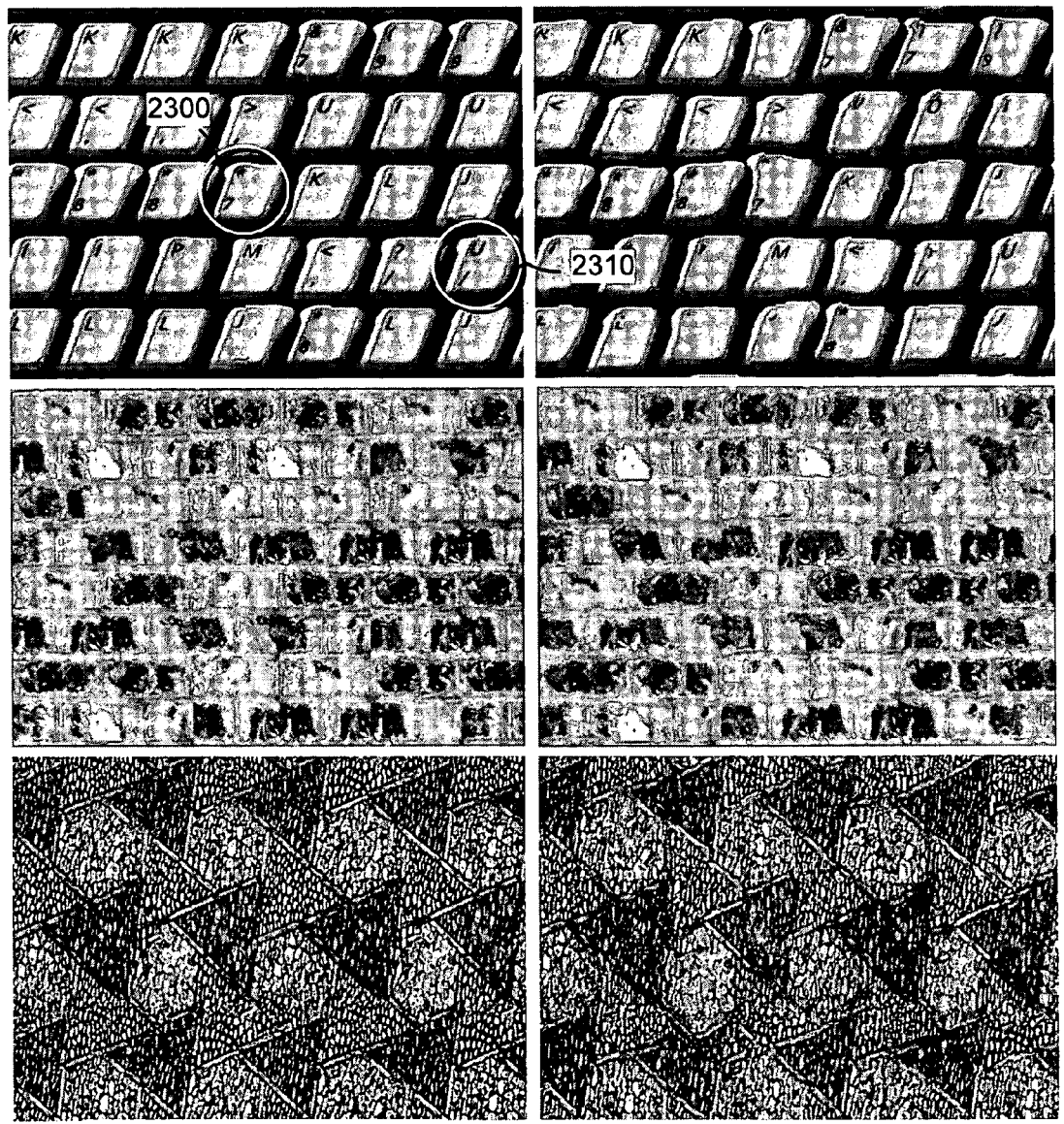
QUANTIZED JITTER · QUANTIZED JITTER ONLY AT COARSE RESOLUTION LEVELS
FIG. 23

SUB-PASS CORRECTION USING NEIGHBORHOOD MATCHING

BACKGROUND

Texture mapping is an efficient and popular way to add details on surfaces in computer graphics applications. However, creating large and detailed texture maps is a difficult and tedious task. Moreover, these texture maps are usually at high resolution and often do not fit into available memory. Texture synthesis algorithms (such as sample-based texture synthesis techniques) are aimed at automatically generating large textures from a small example image (known as a texture sample or exemplar). Sample-based texture synthesis both reduces content creation time and storage requirements since the large texture can be generated from the exemplar and a set of parameters.

In general, sample-based texture synthesis takes an exemplar and generates additional content based on that exemplar to create much more content that is contained in the exemplar. Sample-based texture synthesis analyzes a given exemplar to create visually similar images. In graphics, these images often contain surface attributes like colors and normals, as well as displacement maps that define geometry itself. Sample-based texture synthesis alleviates the need to store explicitly an entire expanse of content. Instead, the content is generated "on the fly" from the much smaller exemplar.

Currently, there are several approaches to sampled-based texture synthesis. These approaches include tiling, patch optimization, and neighborhood-matching techniques. There are several types of tiling techniques. One of the simplest tiling techniques is to merely generate "tiled" content by creating multiple copies of the exemplar and placing them together in a tiled pattern. At large scales, the pattern of the exemplar appears repeatedly in the final content.

Another type of tiling technique precomputes a set of Wang Tiles designed to abut seamlessly along their boundaries. With a complete tile set, runtime evaluation is simple and parallel, and is therefore achievable in the graphics processing unit (GPU) pixel shader. In addition, this type of tiling technique allows some coarse control by transitioning between tiles of different textures.

Although tiling techniques are the fastest of the sampled-based texture synthesis techniques, their main drawback is that due to the fixed tile set the textures generated are repetitious and lack variety. In other words, the tiling techniques create generally unvaried and uninteresting results because of the large scale repetitions. Also, the regular tiling structure may become apparent when the texture is viewed from afar (or at large scale), especially for non-homogeneous textures.

Another type of sample-based texture synthesis is patch optimization. The patch optimization technique creates a texture by iteratively overlapping irregular patches of the exemplar to minimize overlap error. Dynamic programming or graph cut methods can be used to improve inter-patch boundaries. Because patch layout is a nontrivial optimization it is precomputed. Moreover, the layout process is inherently sequential. Control is possible by allowing a user override the delineation and positioning of patches. Although patch optimization techniques produce some of the best results of the sample-based texture synthesis techniques, their main drawback is that they lack much fine-scale adaptability during synthesis.

Yet another type of sample-based texture synthesis is neighborhood-matching. Neighborhood-matching techniques generate one pixel at a time in scanline or spiral order. For each pixel, the partial neighborhood already synthesized is compared with exemplar neighborhoods to identify the most likely pixels, and one pixel is chosen. The selected pixel is the pixel whose neighborhood best matches the currently synthesized neighborhood. Improvements to neighborhood-matching include hierarchical synthesis, fast vector-quantization (VQ) matching, coherent synthesis to favor patch formation, and precomputed similarity sets.

The major drawback with the neighborhood-matching, tiling, and patch optimization techniques is that they synthesize sequentially. For neighborhood-matching, sequential synthesis requires the use of a neighborhood that has already been synthesized to determine the current neighborhood. This introduces a "chain of dependencies" or "dependency chain" in the synthesis process. For tiling and patch optimization, sequential synthesis requires positioning of one tile or patch at time, such as in a left-to-right or a top-to-bottom fashion. For example, in order to find a location of a patch or tile in the middle of the texture, the entire texture up to that point must be generated. It is not possible to jump to one position and render a small window of texture. Instead, every single position between the beginning and the position must be generated. This is computationally expensive. Moreover, it is impractical to define huge deterministic landscapes because the entire image must be synthesized even if only a small portion of the landscape is visible or being displayed to a user.

At least one current neighborhood-matching technique attempts to achieve order-independent texture synthesis. The goal of this order-independent texture synthesis is to go to any arbitrary point in any arbitrary order and be able to synthesis texture. Instead of using a sequential search, the technique replaces each pixel by what is closest or best matches its neighbors. The technique uses a multi-resolution synthesis approach that is not implemented in parallel. In this multi-resolution or pyramid synthesis approach, multiple passes of pixel correction are applied at each pyramid level to match neighborhoods of the exemplar. The crucial innovation of this order-independent texture synthesis is to perform correction on all pixels independently, to allow deterministic synthesis of pixels in arbitrary order.

For example, the coarsest level (or level 0) is initialized with random colors. This is similar to sequential synthesis. Then, a sequence of correction passes are used that replace each pixel by the one pixel from the exemplar that best matches its current neighborhood. Each such correction pass is called a generation of synthesis. For the first generation at each level, a previous level is used to match colors at the coarser level to define the best matching coordinates for the next current level. Thus, in generation 0 of level 1, a 5×5 neighborhood of the coarser level 0 is used to infer the first coordinate for the next finer level (level 1). The 5×5 level 0 neighborhood is run over the exemplar, and a coherence search is used to speed up the search for a best matching neighborhood. For subsequent generations at each level, the neighborhood at both the current level and the previous coarser level are taken so that the search compares neighborhoods of both levels. For every pixel at a current level, a 5×5 neighborhood is used along with the previous coarser level.

By way of example, generation 0, level 1, is only generated using neighborhoods from level 0, generation 0. Generation 1 of level 1, uses neighborhoods from level 0, generation 0 and level 1, generation 0. Then, from level 1, generation 1, level 1, generation 2 is generated, using both neighborhoods from level 1, generation 1 and level 0, generation 0. Information from generation 2, level 1 is used to produce generation 0, level 2. When generation 1, level 2 is produced, neighbors from level 2, generation 0 and level 1, generation 2 are used (because it is the latest available). Thus, this order-independent texture synthesis technique considers only the best available generations of the current level and the previous level.

This order-independent texture synthesis technique "pulls" information forward instead of the majority of texture synthesis schemes, which "push" the information forward. In other words, requests for pixel are generated one at a time. Next, examination occurs of all the pixels at the different levels of generations that contribute to the final color.

One problem, however, with order-independent texture synthesis is that it is quite complex. Specifically, the approach uses a texture cache architecture (which is a per pixel demand-based architecture) that adds complexity. For each pixel, the cache contains information about which other pixels are required in the previous generations from the previous levels. If this information is not in the cache, then a cascade of evaluations must be computed. This means that if the graphics hardware wants to color a particular pixel, and if the pixel color is not in the texture cache, the graphics hardware must perform the above cascade of calculations to obtain this color.

Another problem with the order-independent texture synthesis scheme is that it is not implemented in parallel architecture, such as graphics processing units (GPUs). In fact, most neighborhood-matching synthesis algorithms cannot support parallel evaluation because their sequential assignment of output pixels involves long chains of causal dependencies. The computation cannot be mapped efficiently onto a parallel architecture like a GPU or multi-core central processing unit (CPU).

For the purpose of computer graphics, it is advantageous to implement texture synthesis on a parallel processor such as the GPU because the texture synthesis output is then written directly to video memory which is more easily accessible for graphics. If processing is performed on a CPU, the output must be transferred from system memory to the video memory. Implementation on a parallel processing unit such as the GPU discharges the CPU from texture synthesis and frees the CPU for other processing. Parallel processing on the GPU also allows real-time texture synthesis, and therefore alleviates the need to store vast amounts of texture and reduces memory consumption.

While many of the above-mentioned synthesis schemes offer some form of user guidance, they provide little control over the amount of texture variability. Typically, output variation is obtained by random seeding of boundary conditions (such as the random colors chosen to initialize the coarsest synthesis level). As one modifies the random seeds or adjusts algorithmic parameters, the synthesized result changes rather unpredictably. Thus, current sample-based texture synthesis techniques offer the user little control over the amount, placement and type of variation of the synthesized texture.

SUMMARY

The invention disclosed herein includes a parallel texture synthesis method and system that synthesizes texture using a multi-resolution pyramid, in which finer resolution levels are initialized by upsampling coordinates from the coarser resolution levels. The parallel texture synthesis technique uses a framework based on a neighborhood matching technique having order-independent texture synthesis and includes all of its advantages. However, the parallel texture synthesis technique extends that approach in at least two areas, including efficient parallel synthesis and intuitive user control. Moreover, unlike the existing neighborhood matching technique having order-independent texture synthesis, the upsampling process of the parallel texture synthesis technique upsamples pixel coordinates instead of pixel colors. Using pixel coordinates instead of pixel colors reduces computational complexity and expense. In addition, the parallel texture synthesis technique is optimized for parallel processing, such as implementation on a graphics processing unit (GPU).

The parallel texture synthesis technique includes using pixel coordinates from a sample texture (or an exemplar) to synthesize a texture. A multi-resolution approach is used, such that successive levels have increasingly finer resolution. An iteration is performed such that upsampling occurs at each resolution level. In addition, at each resolution level the upsampled pixels may be jittered, using a controllable jitter process, and corrected, using a sub-pass correction process. For the upsampling process, at each resolution level pixel coordinates (instead of pixel colors) are upsampled to generate additional pixels. At a coarsest resolution level, an image containing zeros (a black image) is used to initialize the upsampling process. Pixel coordinates from the image containing zeros are upsampled using a novel process to produce synthesized pixel coordinates at a next resolution level that has a finer resolution than the previous resolution level. The synthesized pixel coordinates then are input to the next upsampling process, which produces synthesized pixel coordinates at increasingly finer resolution levels. The final output are synthesized pixel coordinates. This output synthesized pixel coordinates correspond to pixel colors, which can be used to generate a final synthesized texture image.

The synthesized texture image contains more pixels that the exemplar, although at the same resolution as the exemplar. For example, if the exemplar contains a set of bricks, the synthesized texture will contain bricks of the same size (and same resolution), but the parallel texture synthesis technique can generate a much larger image containing many more bricks. In fact, it can in principle generate an infinite extent of texture. The pixel coordinate upsampling process is designed to be implemented on a parallel processing device, such as a GPU, for faster, less complex, more efficient, and higher-quality texture synthesis than is currently available with existing sample-based texture synthesis approaches.

DRAWINGS DESCRIPTION

Referring now to the drawings in which like reference numbers represent corresponding parts throughout:

FIG. 10 is a block diagram illustrating the effects of the controllable jitter process at different resolution levels.

FIG. 12 illustrates an evaluation order of sub-passes for the sub-pass correction process shown in FIG. 11.

FIG. 15 illustrates a comparison between the sub-pass correction process and existing types of correction techniques.

FIG. 19 illustrates an example of a user interface to control spatial modulation shown in FIG. 18.

FIG. 23 illustrates results of a near-regular texture synthesis.

DETAILED DESCRIPTION

Figure 1:
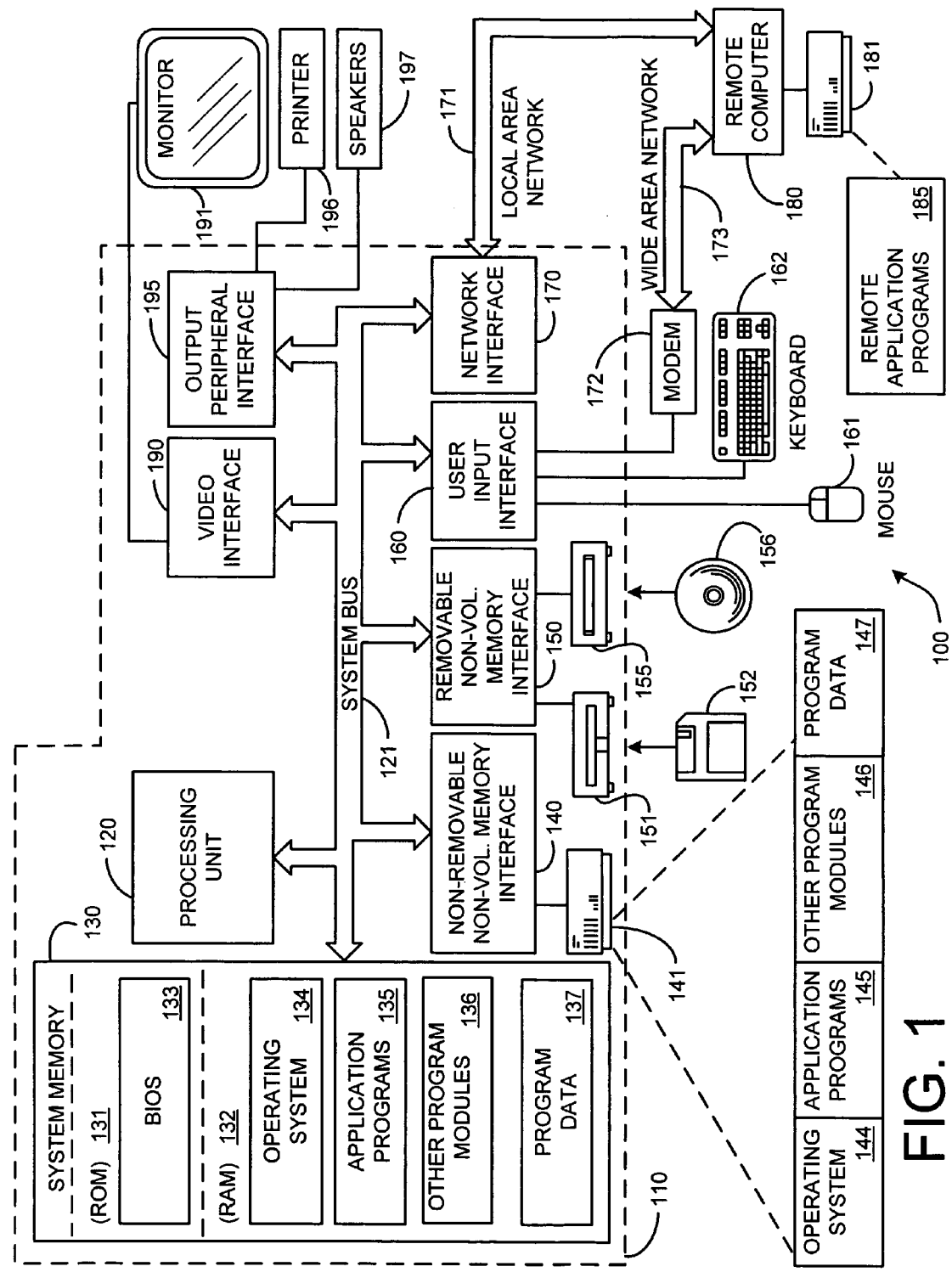
FIG. 1 illustrates an example of a suitable computing system environment in which the parallel texture synthesis system and method may be implemented.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Sample-based texture synthesis is used to generate a large-scale synthesized texture using a small texture sample (or exemplar). This eliminates the need to store explicitly large amounts of texture in memory. Instead, only the much smaller exemplar is stored, and the large-scale texture can be synthesized using the exemplar.

Current sample-based texture synthesis techniques, however, have a number of drawbacks. One drawback is that most of the techniques synthesize texture sequentially. Sequential synthesis means that in order to generate content at a position in the middle of a large-scale texture, every position from the beginning to the middle position must be generated. At least one neighborhood-matching technique mitigates this problem by using order-independent texture synthesis. However, this technique is quite complex and uses an irregular texture cache data structure. Another drawback with this and other techniques is that they are not implemented in parallel architecture, such as graphics processing units (GPUs). Parallel processing implementation (such as on a GPU) is important because this frees the CPU for other processing tasks and also allows real-time texture synthesis. Another drawback to current sample-based texture synthesis techniques is that they offer a user little control over the amount of texture variability.

The parallel texture synthesis system and method disclosed herein overcomes these and other drawbacks of current sample-based texture synthesis techniques. This novel technique, while based on a neighborhood matching technique having order-independent texture synthesis, extends that approach in at least two areas, including efficient parallel synthesis and intuitive user control. The novel technique defines an infinite, deterministic, aperiodic texture, from which windows can be computed in real-time on a GPU. Texture variation is achieved by multi-resolution controllable jittering of exemplar coordinates. Combined with the local support of parallel synthesis, the controllable jitter enables intuitive user controls including multi-scale randomness, spatial modulation over both exemplar and output, feature drag-and-drop, and periodicity constraints. Moreover, pixel coordinates are upsampled instead of pixel colors, thereby reducing computational complexity and expense. In addition, each neighborhood-matching pass is split into several sub-passes to improve correction. Using sub-passes improves correction speed and quality.

The parallel texture synthesis system and method disclosed herein also includes several optimizations for parallel processing implementation (such as on a GPU). For example, one optimization is to evaluate texture windows rather than pixel queries, to cast synthesis as a parallel computation. Moreover, the technique generates arbitrarily positioned windows of texture from an infinite deterministic canvas in real-time. For continuous window motions, incremental computation provides further speedup.

The parallel texture synthesis system and method disclosed herein also allows for more explicit and intuitive user control over texture variation. The key principle is coordinate jitter. Jitter achieves variation by perturbing exemplar coordinates at each level of the synthesized pyramid. The technique starts from a repetitive texture and then adds variation by jittering the coordinates. Each level is initialized by simple coordinate inheritance, so by design the parallel texture synthesis system and method can produce a tiling in the absence of jitter. Starting with this simple but crucial result, randomness can be gradually added at any resolution. For example, variation can be added to displace the macro-features in the texture, or instead to alter their fine detail.

The technique also includes providing a user with a set of continuous sliders that control the magnitude of random jitter at each scale of synthesis. Because parallel synthesis has local support, the output is quite coherent with respect to continuous changes in jitter parameters. Multi-resolution coordinate jitter also enables several forms of local control. It lets randomness be adjusted spatially over the source exemplar or over the output image. The jitter can also be overridden to explicitly position features, through a convenient drag-and-drop user interface. Thanks to the multi-scale coherent synthesis, the positioned features blend seamlessly with the surrounding texture. Finally, the jittered coordinates can be constrained to more faithfully reconstruct near-regular textures. For all these control paradigms, real-time GPU evaluation provides invaluable feedback to the user.

II. Exemplary Operating Environment

The parallel texture synthesis system and method disclosed herein are designed to operate in a computing environment. The following discussion is intended to provide a brief, general description of a suitable computing environment in which the parallel texture synthesis system and method may be implemented.

FIG. 1 illustrates an example of a suitable computing system environment in which the parallel texture synthesis system and method may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The parallel texture synthesis system and method is operational with numerous other general purpose or special purpose computing system environments or configurations. Examples of well known computing systems, environments, and/or configurations that may be suitable for use with the parallel texture synthesis system and method include, but are not limited to, personal computers, server computers, handheld, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The parallel texture synthesis system and method may be described in the general context of computer-executable instructions, such as program modules, being executed by a computer. Generally, program modules include routines, programs, objects, components, data structures, etc., that perform particular tasks or implement particular abstract data types. The parallel texture synthesis system and method may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the parallel texture synthesis system and method includes a general-purpose computing device in the form of a computer 110.

Components of the computer 110 may include, but are not limited to, a processing unit 120 (such as a central processing unit, CPU), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

III. General Overview

Texture synthesis is an effective method of producing large, realistic-looking images at reasonable computational cost. In general, texture synthesis algorithms are able to create new textures with the same visual appearance as a given sample image or exemplar. The parallel texture synthesis system and method described herein allow simple, efficient and controllable high-quality synthesis of texture.

Figure 2:
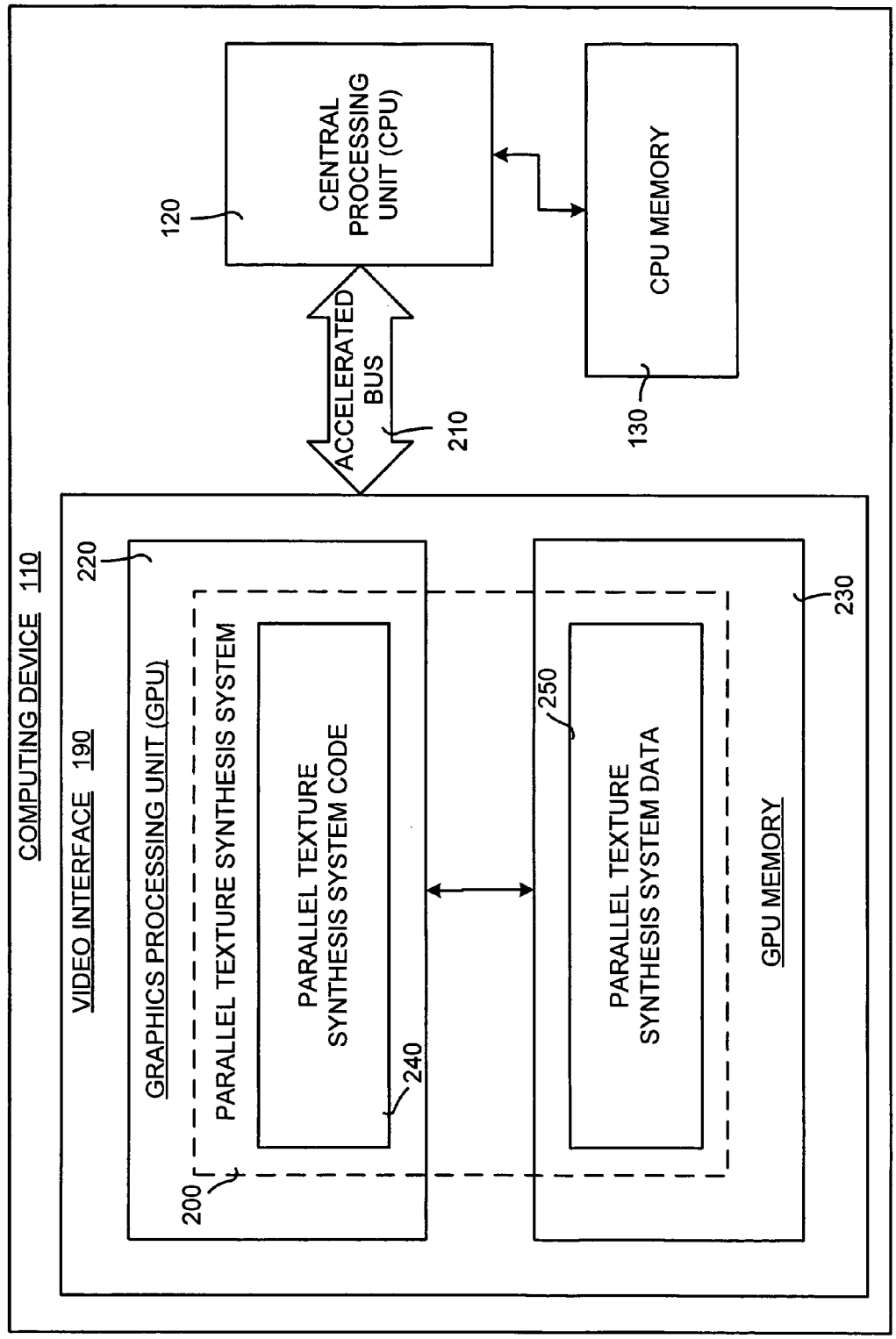
FIG. 2 is a block diagram illustrating an exemplary parallel implementation of the parallel texture synthesis system and method disclosed herein.

FIG. 2 is a block diagram illustrating an exemplary parallel implementation of the parallel texture synthesis system and method disclosed herein. It should be noted that FIG. 2 is merely one of several ways in which the parallel texture synthesis system and method and method may implemented and used. The parallel texture synthesis system and method may also be implemented on other types of processing systems, such as on a central processing unit (CPU) or multi-core processing systems.

As shown in FIG. 2, the computing device 110 contains the central processing unit (CPU) 120 and the CPU memory 130. The CPU is in communication with the video interface 190 through an accelerated bus 210. By way of example and not limitation, this bus 210 may be an Accelerated Graphics Port (AGP) or the newer PCI Express, which are designed especially for the throughput demand of 3-D graphics.

The video interface 190 includes a graphics processing unit (GPU) 220 and a GPU memory 230. GPUs are designed to accelerate real-time 3-D graphics display. The GPU 220 is capable of transferring data to the CPU 120 over the bus 210. The parallel texture synthesis system 200 is also in communication with the GPU 220 and the GPU memory 230. The parallel texture synthesis system 200 is shown in FIG. 2 by the dashed lines. In the implementation shown in FIG. 2, the system 200 includes a parallel texture synthesis system code 240 residing on the GPU 220, and parallel texture synthesis data 250 residing in the GPU memory 230.

IV. Operational Overview

Embodied in the parallel texture synthesis system 200 shown in FIG. 2 is a parallel texture synthesis process. The general operation of the method and process now will be discussed, followed by the operational details and optimization techniques. In general, the parallel texture synthesis method is a non-tile technique that is implemented for parallel processing (such as on a GPU). The parallel texture synthesis method builds a repetitive texture and then gradually adds variation to the texture. The amount, type, and location of the variation can be controlled by a user.

In general, the parallel texture synthesis system 200 inputs uses a multi-resolution approach having multiple resolution levels and perform iterations at each resolution level. At each iteration, pixel coordinates are upsampled, the upsampled coordinates are jittered, and the jittered coordinates are corrected to produce synthesized pixel coordinates. These synthesized pixel coordinates are input to the next iteration at the next higher resolution level. The jittered coordinates are corrected by matching the jittered coordinates with exemplar neighborhoods. In the absence of jitter, the upsampling produces a tiling texture if the exemplar is toroidal. If not, then a tiling still is obtained, but with correction at the tile boundaries.

Thus, starting with a simple result after upsampling, variation is introduced using jitter. Correction recreates neighborhoods compatible with the exemplar content. Rather than correcting all pixels at once, several correction sub-passes are applied. Compared to a full-pass technique, this sub-pass correction process improves correction quality while involving the same amount of computation. The pixel coordinate upsampling and jitter processes disclosed herein can be used together with a standard correction process. In one embodiment, the pixel coordinate upsampling, jitter, and sub-pass correction disclosed herein can be used together to synthesize texture. In another embodiment, the sub-pass correction can be used with any existing synthesis correction technique.

Figure 3:
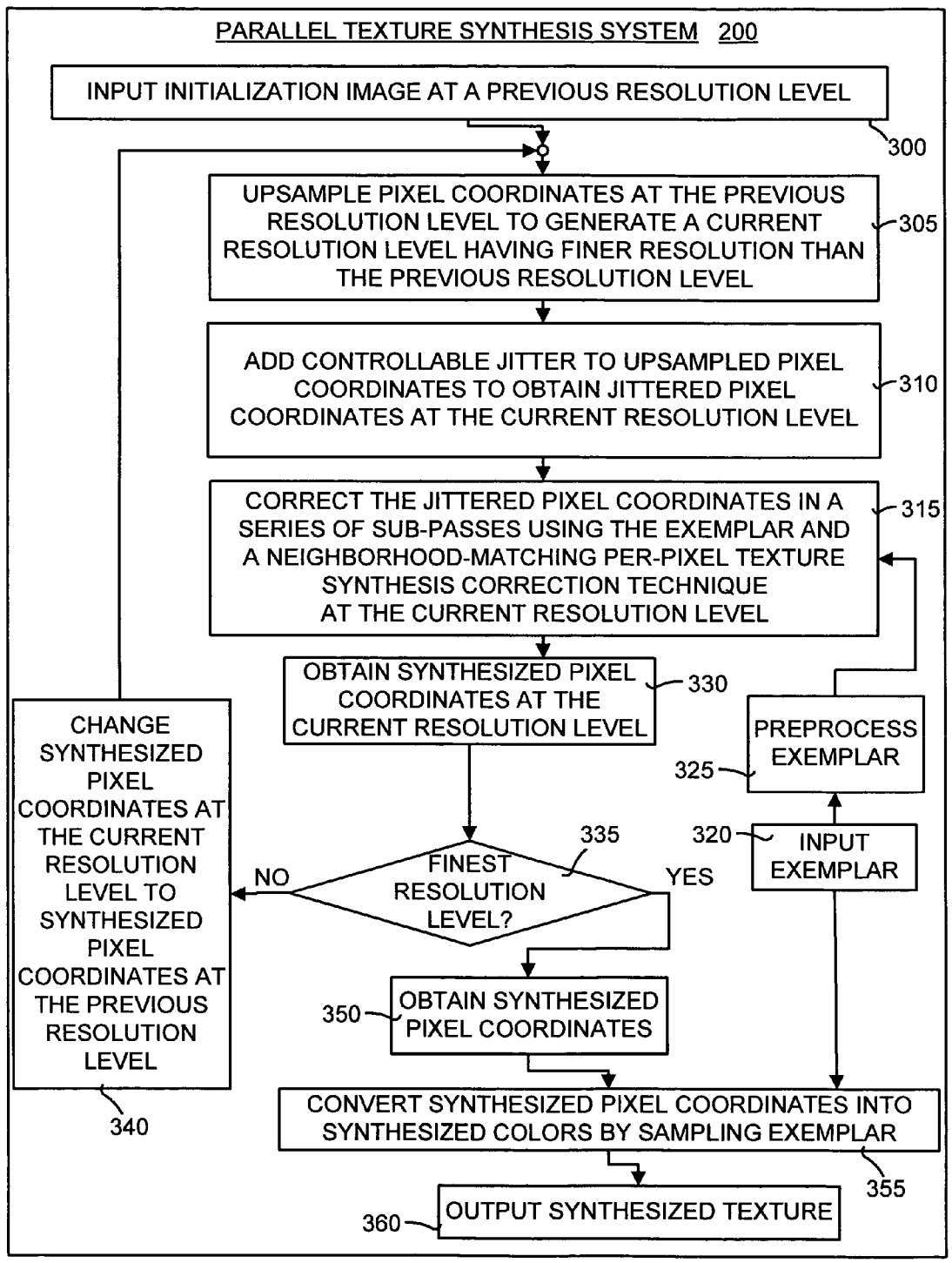
FIG. 3 is a general flow diagram illustrating the general operation of the parallel texture synthesis system shown in FIG. 2.

FIG. 3 is a general flow diagram illustrating the general operation of the parallel texture synthesis system 200 shown in FIG. 2. The iteration process is initialized by inputting an initialization image (box 300). This initialization image typically is an image containing zeros (which has pixel colors that are all black), but can be any image, including a constant image. The initialization image is at a previous resolution level, or the coarsest resolution level of the multi-resolution approach.

The iteration process begins by upsampling pixel coordinates of the image at the previous resolution level (box 305). In the first iteration, the upsampled image is the initialization image. At subsequent iterations the image to be upsampled is the output of the previous iteration. The upsampling generates a current resolution level having a finer resolution level than the previous resolution level. In other words, in the coarse-to-fine pyramid used in the multi-resolution approach, the resolution levels are getting finer with successive iterations. Controllable jitter then is added to the upsampled pixel coordinates to obtain jittered pixel coordinates at the current resolution level (box 310). As explained in detail below, the amount, type, and location of the jitter is controllable by a user through a variety of user interfaces.

Next, the jittered pixel coordinates are corrected in a series of sub-passes (box 315). An exemplar is input for the sub-pass correction process (box 320). After input, the exemplar is preprocessed (box 325). Each correction sub-pass uses the preprocessed exemplar and a neighborhood-matching per-pixel texture synthesis correction technique to correct each jittered pixel coordinate at the current resolution level. The neighborhood-matching per-pixel texture synthesis correction technique is a correction technique that is well known by those having ordinary skill in the art.

The output of each iteration is a synthesized image whose pixels contain exemplar pixel coordinates at the current resolution level (box 330). A determination then is made as to whether the current resolution is the finest (and thus final) resolution level (box 335). The iterations proceed for as many times as there are powers of two in the exemplar. Mathematically, the number of iterations is given by the equation $L=\log_2 m$, where m is the size of the exemplar, or the size of one side of the exemplar image. For example, if the exemplar image contains is $64^2$ pixels, then the size m=64. In the case where the exemplar size is 64, then there are six resolution levels (and thus six iterations) since $2^6=64$.

If the current resolution level is not the finest resolution level, then another iteration is performed. In this case, the current resolution level becomes the previous resolution level. This means that the synthesized pixel coordinates at the current resolution level are now designated as the synthesized pixel coordinates at the previous resolution level (box 340). The iteration then proceeds as before with the input pixel coordinates being upsampled (box 305), jittered (box 310) and corrected (box 315) until the finest resolution level is reached (box 335).

If the current resolution level is the finest resolution level, then the synthesized pixel coordinates are obtained (box 350). These synthesized pixel coordinates may be processed by other applications, or a corresponding synthesized texture may be generated. In order to generate such a synthesized texture, first the synthesized pixel coordinates are converted into synthesized colors by sampling the exemplar (box 355). Finally, from this conversion process, the synthesized texture is the resultant output (box 360).

Figure 4:
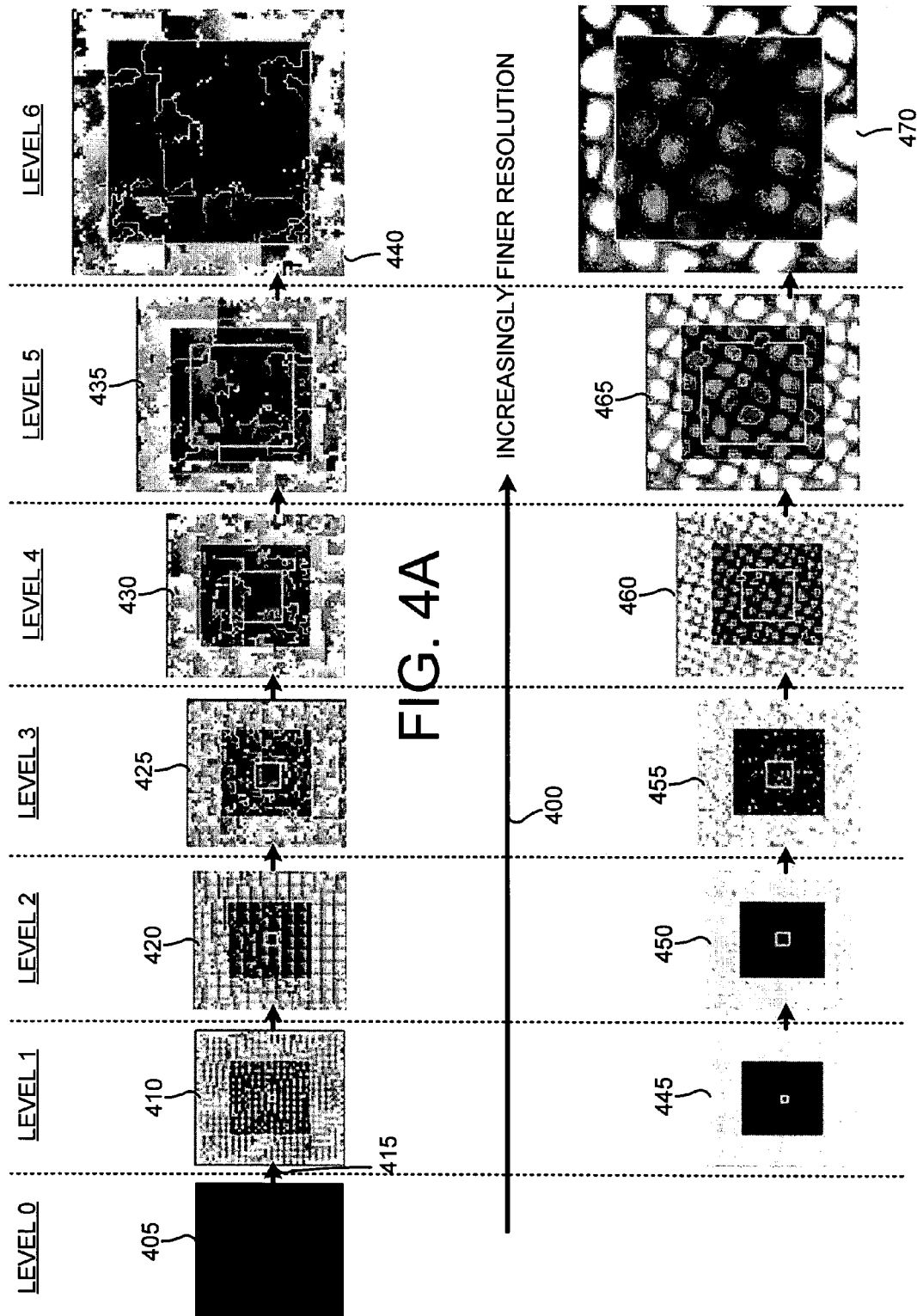
FIG. 4A illustrates an example of the progression of the index maps for progressively finer resolution levels of the parallel texture synthesis process shown in FIG. 3.
FIG. 4B illustrates the corresponding texture images of the index maps shown in FIG. 4A.

FIG. 4A illustrates an example of the progression of index maps for progressively finer resolution levels of the parallel texture synthesis process shown in FIG. 3. An index map is an image whose pixel values contain coordinates referring back to the exemplar image domain. These coordinates can be visualized as colors. For instance, coordinates (0,0) as black, coordinates (1,0) as red, coordinates (0,1) as green, coordinates (1,1) as yellow, and interpolated colors everywhere in between. An index map is a pixel location color map that uses color to indicate a location of a pixel color in the exemplar. In addition, FIG. 4A illustrates the resolution levels for an exemplary implementation having six resolution levels. As shown by the long arrow 400, increasingly higher resolution levels indicate increasingly finer resolution.

As shown FIG. 4A, the parallel texture synthesis process begins by using an image containing zeros (an all black image) 400 at resolution level 0. The iterative process of FIG. 3 is performed (pixel coordinate upsampling, controllable jitter, and sub-pass correction), and the resultant first index map 405 is at resolution level 1. It should be noted that each small arrow between the index map indicates one iterative process as described in FIG. 3. For example, the small arrow 415 between the image containing zeros 405 and the first index map 410 indicates that one iterative process of the parallel texture synthesis method has been performed.

At progressively finer resolution levels, the iteration process is repeated to produce additional resolution levels and index maps. Specifically, an iteration is performed at level 1 to produce a second index map 420 at level 2, another iteration is performed at level 2 to produce a third index map 425 at level 3, and another iteration is performed at level 3 to produce a fourth index map 430 at level 4. A fifth index map 435 at level 5 and a sixth index map 440 at level 6 are generated in the same manner.

FIG. 4B illustrates the corresponding texture images (or synthesized color images) of the index maps shown in FIG. 4A. The texture image colors are obtained by accessing the exemplar colors at the coordinates specified in the synthesized index map. A first texture image 445 corresponds to the first index map 410. Similarly, a second texture image 450 corresponds to the second index map 420, a third texture image 455 corresponds to the third index map 425, a fourth texture image 460 corresponds to the fourth index map 430, a fifth texture image 465 corresponds to the fifth index map 435, and a sixth texture image 470 (or a final synthesized texture) corresponds to the sixth index map 440.

Figure 5:
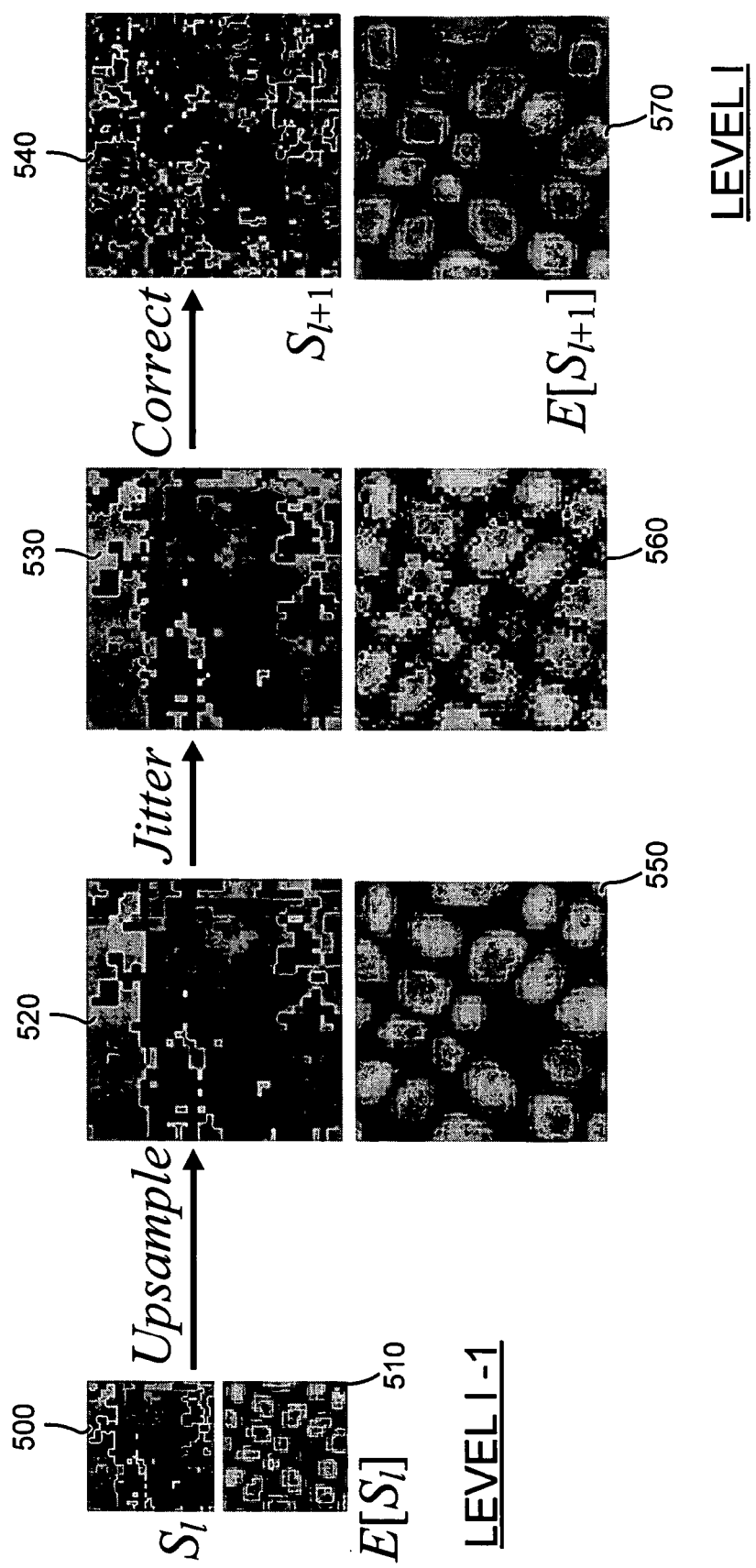
FIG. 5 is a block diagram illustrating an example of the parallel texture synthesis process shown in FIGS. 3, 4A and 4B, going from a previous resolution level to a current resolution level of the multi-resolution approach.

FIG. 5 is a block diagram illustrating an example of the parallel texture synthesis process shown in FIGS. 3, 4A and 4Bm going from a previous resolution level (Level l-1) to a current resolution level (Level l) of the multi-resolution approach. FIG. 5 illustrates the three processes used at each level (and in each iteration) of the multi-resolution approach. For example, referring to FIG. 4A, FIG. 5 illustrates what occurs when going from the first index map 410 to the second index map 420.

A first index map 500 is shown mathematically by the term $S_l$, where $S_l$ is a synthesized coordinate output at a resolution Level l-1 (or a previous resolution level). An exemplar 510 is shown mathematically by the term $E[S_l]$, where $E[S_l]$ is the exemplar 510 as a function of the first index map 500 at resolution Level l-1. The synthesis output is the indices, and the term $E[S_l]$ represents looking up the color in the exemplar, E, given the coordinates S. Thus, the synthesis process produces the index maps, and they correspond to the colors, $E[S_l]$. In other words, S are the synthesized index maps, and $E[S_l]$ is the colors corresponding to those indices.

As in shown in FIG. 5, at each resolution level the pixel coordinates represented by the first index map 500 are upsampled to produce a second index map 520 representing the upsampled pixel coordinates. This upsampling changes the resolution level from Level l-1 (the previous resolution level) to Level l (a current resolution level). Next, the upsampled pixel coordinates are jittered to produce a third index map 530 representing the jitter pixel coordinates at resolution Level l. The jitter coordinates then are corrected to produce a fourth index map 540 representing the corrected pixel coordinates at resolution Level 1.

Texture images corresponding to the index maps also are shown in FIG. 5. Specifically, a first texture map 550 corresponds to the second index map 520, a second texture map 560 corresponds to the third index map 530, and a third texture map 570 corresponds to the fourth index map 540. The index maps are represented mathematically by the term $S_{l+1}$, and each texture images is represented as a function of its corresponding index map, namely, as $E[S_{l+1}]$.

From an m×m exemplar E, image S is synthesized in which each pixel s[p] stores the coordinates u of an exemplar pixel (where both p,u $\in \Box^2$). Thus, the color at pixel p is given by E[u]=E[S[p]]. A traditional hierarchical synthesis is applied, creating an image pyramid $S_0, S_1, \ldots, (S_L=S)$ in coarse-to-fine order, where, as stated above, $L=\log_2 m$.

Figure 6A:
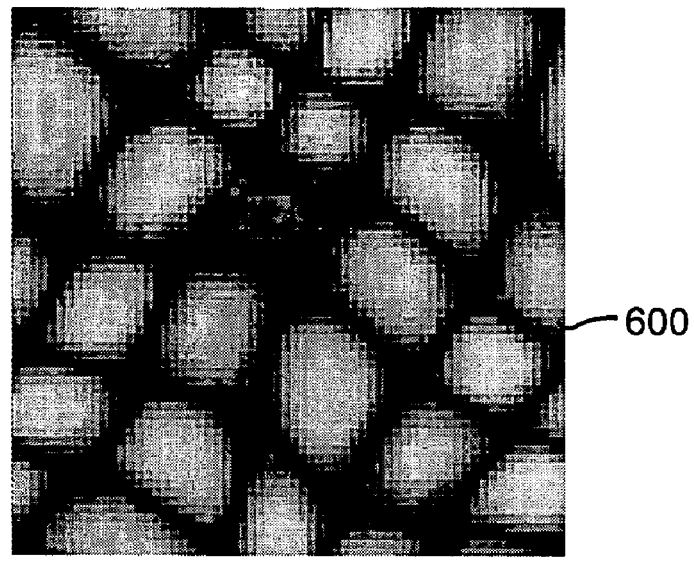
FIG. 6A illustrates an example of an exemplar.
Figure 6B:
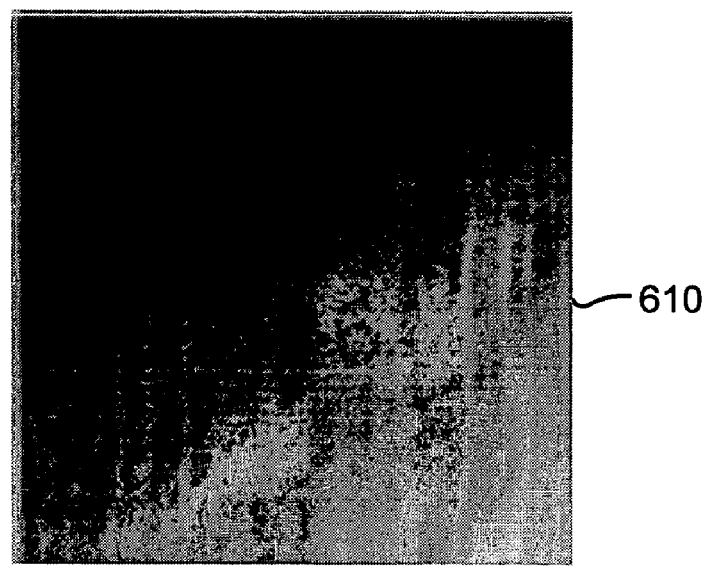
FIG. 6B illustrates an index map corresponding to the exemplar shown in FIG. 6A.

FIG. 6A illustrates an example of an exemplar 600. As discussed above an in further detail below, the exemplar 600 is used in the parallel texture synthesis method to synthesize texture. FIG. 6B illustrates an index map 610 corresponding to the exemplar 600 shown in FIG. 6A. Instead of just looking at the color values of the exemplar 600, the idea is to examine the pixel coordinates of the exemplar 600.

In general, these coordinates will be represented by x,y pixel locations. The x,y values are included as red and green colors. For example, the top right corner of the index map 610 is red because y=1 and x=0. When going from the top left corner to the top right corner, the color goes from black to red on the index map 610, meaning that x=0 and y becomes 1. If y=0, the color is black. If y goes up to y=1, which is green, shown in the lower left corner of the index map 610. In the lower right corner of the index map 610, where y=1 and x=1, the color is red and green, which makes yellow.

Thus, the index map 610 illustrates the location within the exemplar 600 of the pixel coordinates. The index map is an image for encoding source (or exemplar) coordinates. The index map 610 gives a way to look at exemplar coordinates as colors. During texture synthesis pixels are copied from the exemplar 600 at particular coordinates, and the index map 610 shows at every location of the output texture, the coordinates of the exemplar 600 from which the pixel was taken. Another way to think about it is that every time a coherent color is seen in the index map 610, it means that a patch of pixels was pulled from the same region of the exemplar 600, as a contiguous patch.

Figure 7:
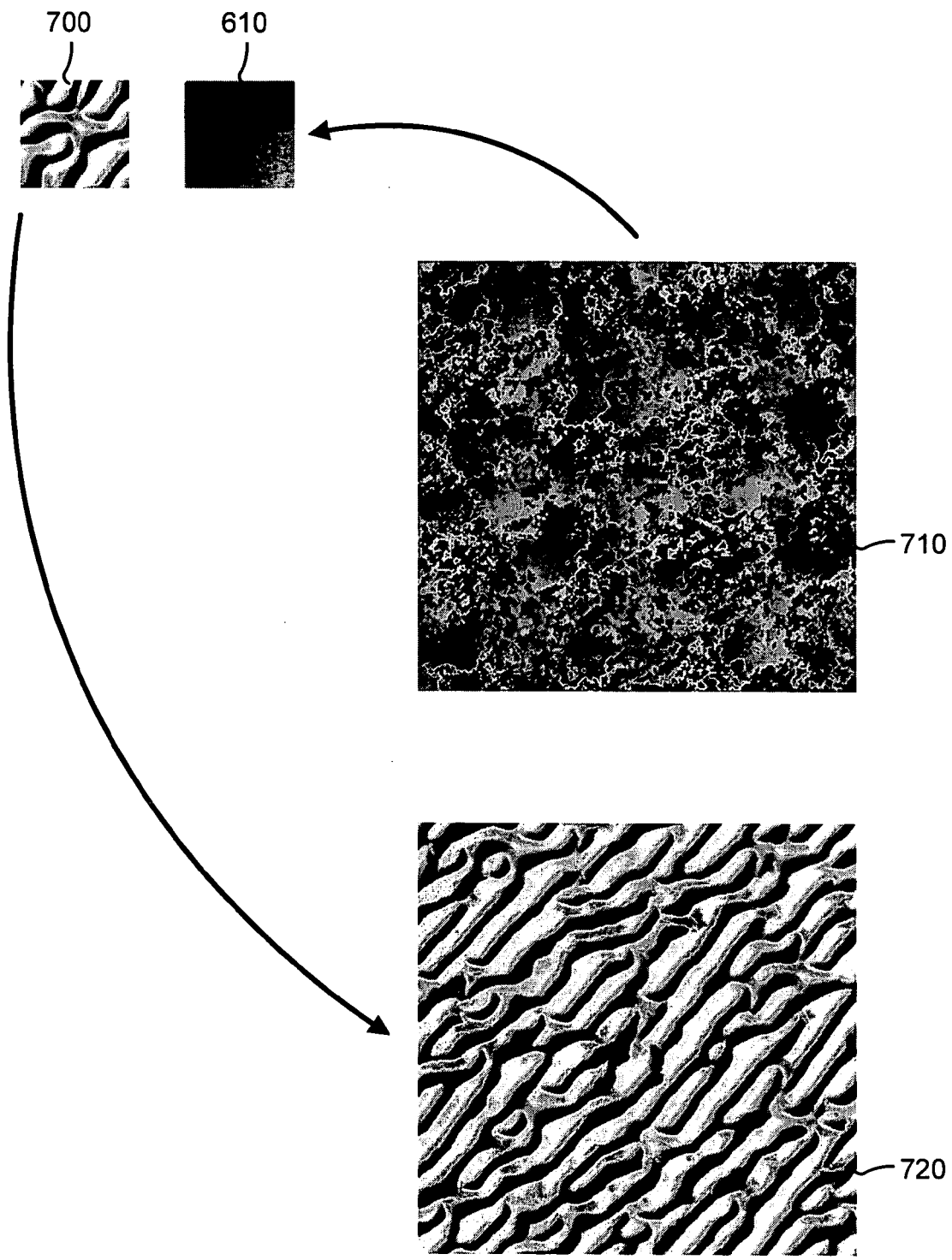
FIG. 7 illustrates an example of using an exemplar and the index map shown in FIG. 6B to synthesize a texture.

FIG. 7 illustrates an example of using an exemplar 700 and the index map 610 shown in FIG. 6B to synthesize a texture. As in FIG. 6A, the exemplar 700 is a sample texture that contains a small amount of content and is used in the parallel texture synthesis process. The index map 610 and the exemplar 700 are used for encoding pixel coordinates of the exemplar 700. An image location map 710 is produced from the index map 610 that indicates a pixel location in the exemplar 700 (via the index map 610) of each pixel in a synthesized texture 720. Referring back to FIGS. 4A and B, the image location map 710 corresponds to the sixth index map 440, and the synthesized texture 720 corresponds to the sixth texture image 470 (or the final synthesized texture).

Thus, the parallel texture synthesis method uses a multi-resolution approach to produce synthesized texture. At each resolution level, pixel coordinates are upsampled, jittered and corrected. Pixel coordinate upsampling produces a finer resolution level containing the upsampled pixel coordinates. These upsampled pixel coordinates are jittered in a controllable manner to produce jittered pixel coordinates. The jittered pixel coordinates are corrected using a series or sequence of correction sub-passes to produce synthesized pixel coordinates. Within each correction sub-pass, each pixel is replaced independently by an exemplar pixel whose neighborhood best matches the current synthesized neighborhood. Preferably, only those neighborhoods from the current resolution level (Level I) are used to correct the pixels. In other words, preferably pixels or other information from the previous level (such as from resolution Level l-1) are not used. It should be noted, however, that even if pixels and other information from previous levels is used, the parallel texture synthesis process still can be implemented for parallel processing.

Following is pseudocode of the overall process:

```
Synthesize( )
    S_{-1} := (0 0)^T       // Start with zero 2D coordinates.
    for l∈{0 ... L}        // Traverse levels coarse-to-fine.
        S_l := Upsample(S_{l-1})   // Upsample the coordinates.
        S_l := Jitter(S_l)         // Perturb the coordinates.
        if (l>2)                   // For all but three coarsest levels,
            for {1 ... c}          // apply several correction passes,
                S_l := Correct(S_l)    // matching exemplar neighborhoods.
    return S_L
```

V. Operational Details

The details of the operation of the parallel texture synthesis system and method shown in FIGS. 2-7 now will be discussed. In order to more fully understand the parallel texture synthesis system and method, the operational details of exemplary embodiments are presented. However, it should be noted that these exemplary embodiments are only a few of several ways in which the parallel texture synthesis system and method may be implemented and used.

Preprocessing

Initially, texture analysis is performed on the exemplar to obtain a coarsest resolution level. This is a preprocess step, where a Gaussian pyramid is created by starting from the finest resolution level and successively filtering the levels with a Gaussian blurring filter. In other words, the coarsest resolution level is created from the finer resolution level by applying a filtering operation. This continues all the way to the coarsest resolution level, whose pixel (or pixels) are so blurred that they in fact all have the same color. This is the average color of the image. For example, in a Gaussian pyramid, there is a single unique pixel at the coarsest level whose color is the average color of the entire image.

Parallel Texture Synthesis Processes

Once preprocessing is completed, a multi-resolution approach is used to synthesize texture. This multi-resolution approach is a coarse-to-fine process that produces increasingly finer resolution levels through each iteration. After each iteration a finer resolution level is produced. Each iteration of the multi-resolution performs a pixel coordinate upsampling process, a controllable jitter process, and a sub-pass correction process. Each of these three processes now will be discussed in detail.

Pixel Coordinate Upsampling

Current texture synthesis techniques that use a coarse-to-fine (or multi-resolution) pyramid synthesize pixels based on the "colors" of the parent pixels and their neighborhoods. However, this matching based on neighborhood color is much more expensive than the coordinate upsampling process used by the parallel texture synthesis method. The coordinate upsampling process disclosed herein uses the pixel coordinates to initialize the image levels in a synthesize pyramid.

This means that four children pixels are assigned coordinates inherited (or upsampled) from the parent pixel in a previous coarser resolution level.

Figure 8:
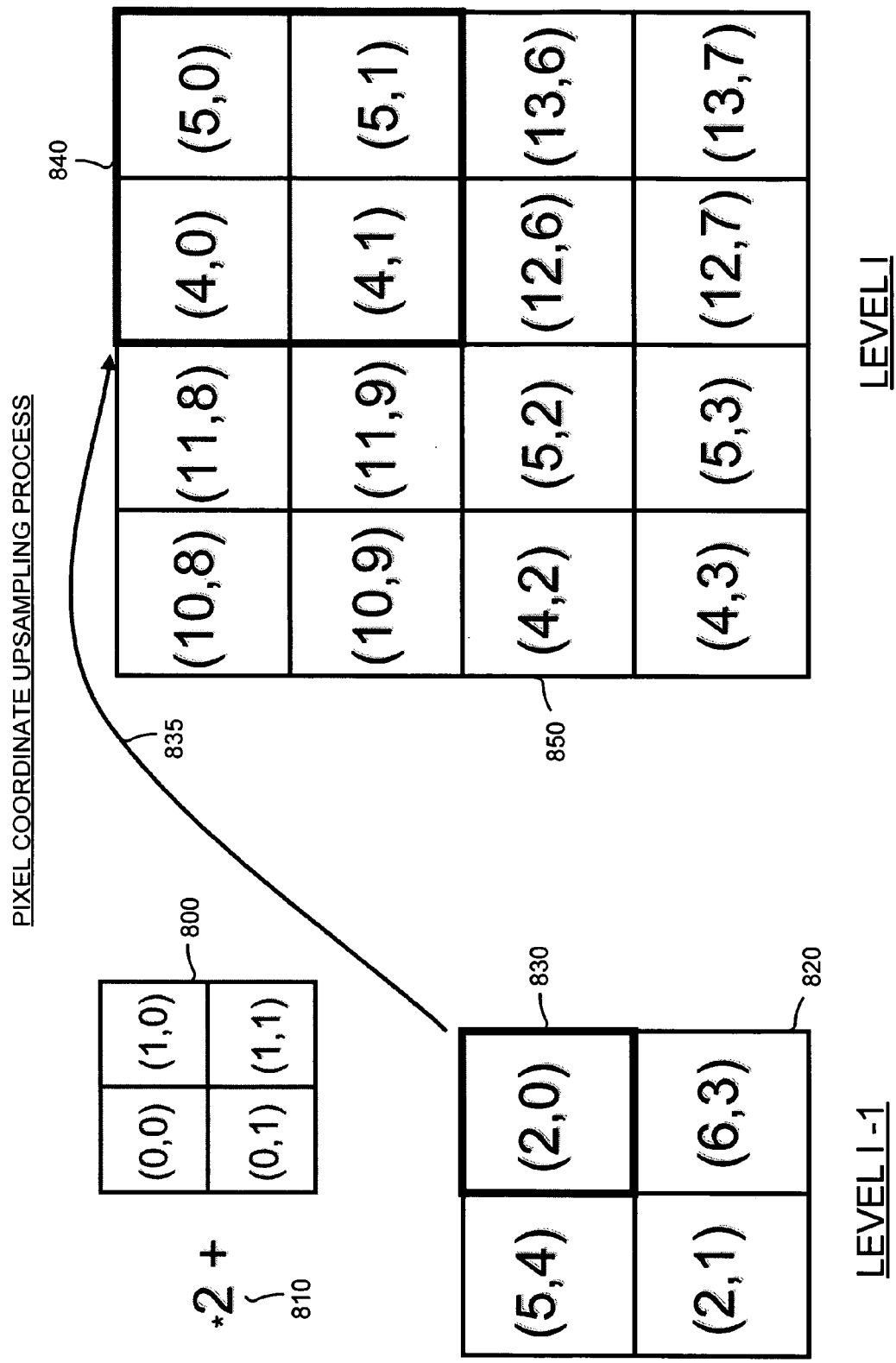
FIG. 8 illustrates the pixel coordinate upsampling process at a resolution level of the multi-resolution approach whereby each parent pixel has four children pixels.

FIG. 8 illustrates the pixel coordinate upsampling process at a resolution level of the multi-resolution approach whereby each parent pixel has four children pixels. In general, the pixel coordinates upsampling process takes pixel coordinate from a previous resolution level and applies an upsampling technique to the pixel coordinates to obtain upsampling pixel coordinate at a current resolution level. The upsampling technique is shown graphically in FIG. 8. In particular, as described below, an offset mask 800 is used in the upsampling process. In FIG. 8, for a first texture image 820 at the previous resolution Level l-1, an upper right coordinate (2,0) is designated as a parent pixel coordinate 830. This parent pixel coordinate 830 then is upsampled to produce child pixel coordinates.

The upsampling of the parent pixel 830 occurs by multiplying the parent pixel 830 coordinates (2,0) by a factor of 2 810 to obtain a result. Next, the offset mask 800 is added the result to obtain each of the child pixel coordinates, such that each child pixel coordinate receives a different offset based on its position relative to the parent pixel coordinates 830. As shown by the arrow 835 in FIG. 8, the resulting child pixel coordinates are at the upper right corner 840 of a second texture image 850 that is at the current resolution Level l that has a finer resolution than Level l-1. In this example, the four children pixel coordinates contained in the upper right corner 840 of the second texture image 850 are (4,0), (5,0), (4,1), and (5,1), respectively. The output of the coordinate-based upsampling is a tiled texture. In the upsampling step, only pixel coordinates are considered. In other words, instead of colors, the upsampling process is generating pixel coordinates.

Rather than using a separate synthesis pass to create the finer image from the next coarser level, coordinates of the parent pixels are upsampled. Specifically, each of the four children are assigned the scaled parent coordinates plus a child-dependent offset:

$$S_l[2p + \Delta] := \left(S_{l-1}[p] + \left\lfloor h_l\left(\Delta - \binom{.5}{.5}\right)\right\rfloor\right) \mod m, \quad (1)$$

$$\Delta \in \left\{\binom{0}{0}, \binom{0}{1}, \binom{1}{0}, \binom{1}{1}\right\}.$$

where "mod m" used to denote per-coordinate operations and S is the synthesized coordinate output. Also, $h_l = 2^{L-l}$, where $L = \log_2 m$.

If the exemplar is toroidal and jitter is disabled, successive upsamplings create the image $S_L[p] = p \mod m$, which corresponds to tiled copies of the exemplar E; the correction step then has no effect because all neighborhoods of $S_L$ are present in E.

At level, l, each pixel at location $2p+\Delta$ is assigned a function of the coordinates stored in the parent pixel at location p in level l-1, where specifically, the function is to multiply the coordinates by 2 and add an offset that depends on the relative location $\Delta$ A of the child pixel with respect to the parent. A factor of two is used because the finer level has twice as many pixels on each image axis. $\Delta$ is a 2D vector that represents the index of the four children of the pixel. Each node at a coarser level has four child nodes in the finer level.

It should also be noted that in equation (1) the symbol ":=" means "an assignment". Thus, the two collection of terms on either side of the ":=" symbol are not necessarily equal, but the value on the right side is assigned to the variable on the left side. The notation x mod m denotes taking x modulo m, where the integer m is the size of the exemplar. In other words, if the coordinates are jittered to go out of bounds, they wrap around. Effectively, all processes that operate on exemplar coordinates (including upsampling, jittering, and neighborhood formation during correction) take the exemplar coordinates to be on a toroidal domain. In the absence of jitter, the upsampling process produces a tiling texture if the exemplar content is toroidal. If not, then tiling is still obtained, but with correction at the tile boundaries. If the exemplar content is non-toroidal, all the neighborhoods crossing the border are invalid, in the sense that they do not represented intended content of texture. To produce a visually nice tiling, the neighborhood from the exemplar that are crossing the border are simply ignored during best matching search.

In the above discussion, it should be noted that the word "toroidal" is used in two different meanings. First, the algorithm processes treat the domain of the exemplar coordinates as being toroidal. That is, coordinates always wrap around (mathematically, using the "mod s" notation). Second, the provided exemplar image may or may not contain content that is toroidal. If the exemplar content is not toroidal, then there is a special case in the correction process that forces correction to move the synthesized coordinates away from the boundary of the exemplar, so that the final synthesized output image does not contain any content right at the exemplar boundaries.

Controllable Jitter

If only tiling was desired, then the pixel coordinates upsampling process would suffice for synthesizing texture. However, it is desirable to generate variations and remove artifacts of simple tilings. For this purpose, a controllable jitter process is used to perturb the upsampled pixel coordinates.

Figure 9:
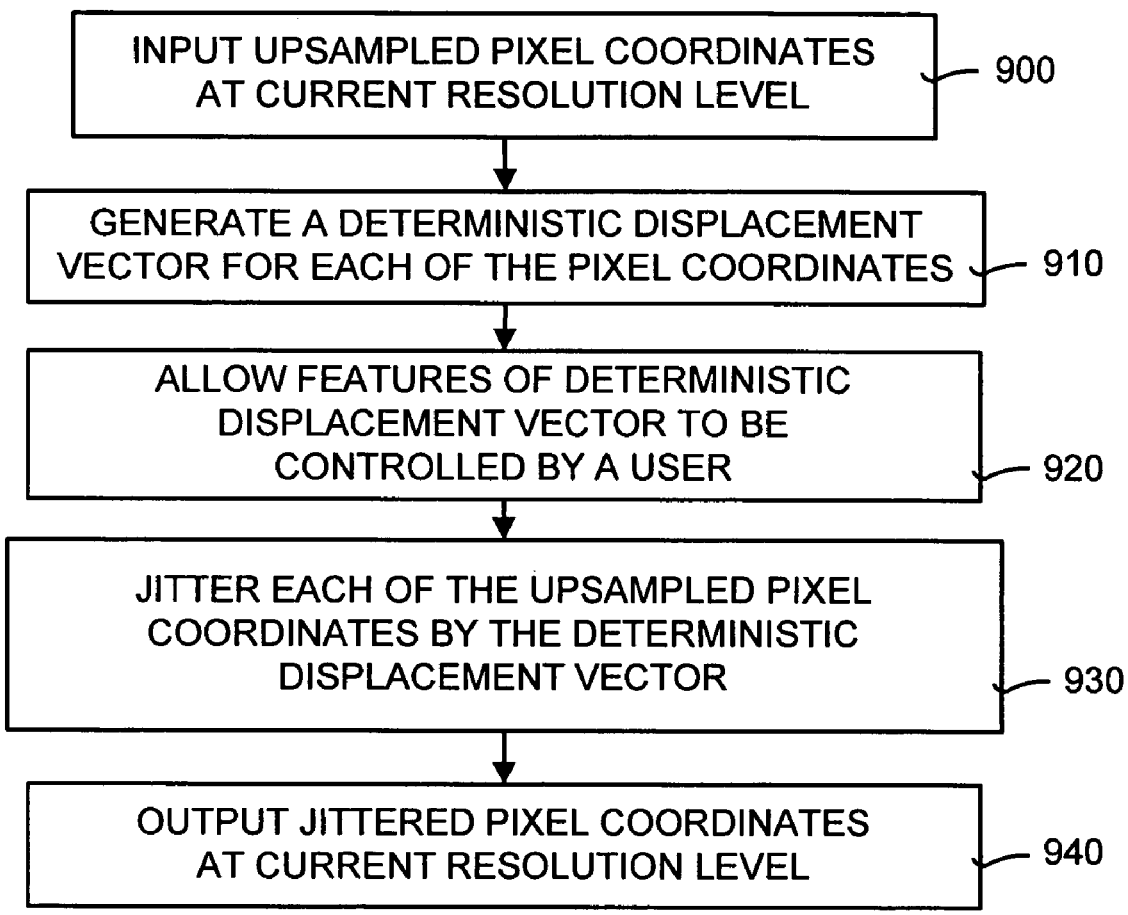
FIG. 9 is a detailed flow diagram illustrating the controllable jitter process.

FIG. 9 is a detailed flow diagram illustrating the controllable jitter process. The jitter process begins by inputting upsampled pixel coordinates at the current resolution level (box 900). Next, a spatially deterministic displacement vector is generated for each of the pixel coordinates (box 910). The deterministic displacement vector is such that the features of the vector can be controlled by a user (box 920). Each of the pixel coordinates then are jittered by the deterministic displacement vector (box 930). The output are jittered pixel coordinates at the current resolution level (box 940). Referring back to FIG. 5, the third index map 530 representing the jitter pixel coordinates and the corresponding second texture map 560 illustrate the effects of the controllable jitter process.

One purpose of the controllable jitter process is to introduce variations. From the pixel coordinate upsampling process, the result is a location within the exemplar for every pixel. Jitter perturbs the location of the pixel by adding a small displacement. This is achieved by generating a random displacement vector for each of the pixels. Each displacement vector has a different amplitude, and the amplitudes are controllable by the user. These small displacements are added to the coordinates of the pixels.

For example, the pixel coordinates (3,3) may become (4,4), and pixel coordinates (3,2) may become (3,3). The pixel are not actually being moved around, but instead the pixel ecoordinates where the pixels are read from are being perturbed. In effect what is occurring with the controllable jitter process is that noise is being adding to the pixel coordinates. Referring again to FIG. 5, although the second index map 520 representing the upsampled pixel coordinates and the third index map 530 representing the jitter pixel coordinates look similar, upon close inspection it can be seen that the all the colors (which represent pixel coordinates) have been moved about. The index maps 520, 530 (and there corresponding textures images 550, 560) look similar because the added jitter or perturbation is small. However, a close inspection reveals the results of the jitter process.

Note that when jitter is applied to a pixel at a coarser level during synthesis, the sequence of subsequent upsampling steps at finer levels will effect all pixels that are transitively children of that original coarse-level pixel. As an example, in FIG. 10, jitter is applied at various resolution levels without any correct; when the jitter is applied to four coarse pixels, the effect 1000 is that four square regions of the final synthesized image are displaced. When jitter applied to the sixteen pixels at the next finer level, and the effect 1010 is that sixteen smaller square regions of the final synthesized image are displaced.

The features of the deterministic displacement vector used to jitter the pixel coordinates can be controlled by the user. The general idea is that the user is able to control the strength of variations that are introduced. For example, in FIG. 5, if strong variations were introduced, then the difference between the second index map 520 and the third index map 530 would be much more apparent. On the other hand, when small variations are introduced, it is more difficult to see the differences between the two index maps 520, 530.

One feature of the deterministic displacement vector that is controllable is the amplitude of the vector. In one embodiment, the amplitude is the only feature of the vector that is controllable by the user. The other features of the vector are randomly selected. In an alternative embodiment, the user is provided with a "drag-and-drop" functionality that allows the user to override the randomness of the vector. Instead of a random vector, the vector is specified by the user, so that entire features of the texture can be moved to desired locations. This drag-and-drop functionality is discussed in detail below.

A hash function is used such that the same random vector is evaluated every time that the same pixel is evaluated. In other words, the x,y coordinates that are being synthesized are processed using a function that supplies a random value. The hash function ensures that the random value is the same random value for the same location. In other words, even though the jitter applied has a random component, for a given exemplar, the synthesized index map in the final output will always be the same at the same coordinates. The synthesized content is therefore deterministic.

Mathematically, in order to introduce spatially deterministic randomness, the upsampled coordinates are perturbed at each resolution level by a jitter function. The jitter function is the product of a hash function $H: \square^2 \to [-1,+1]^2$ and a user-specified per-level randomness parameter $0 \leq r_l \leq 1$:

$$S_l[p] := (S_l[p] + J_l(p)) \bmod m, \quad (2)$$

where $$J_l(p) = \left\lfloor h_l \mathcal{H}(p) r_l + \begin{pmatrix} .5 \\ .5 \end{pmatrix} \right\rfloor.$$

$J_l$ is a jitter function, and H(p) is the hash function. The term, $r_l$, is the user-specified magnitude of the jitter for that resolution level. This magnitude can be changed by the user through a user interface (such as a slider). In equation (2), 0.5 is added to each floating point coordinate and then the floor is taken, which is the same as rounding to the nearest integer. In a preferred embodiment, the output-spacing factor $h_l$ reduces the jitter amplitude at finer resolution levels, as this is generally desirable.

FIG. 10 is a block diagram illustrating the effects of the controllable jitter process at different resolution levels. In particular, if no correction is used (the sub-pass correction process is discussed below), then the effect of jitter at each resolution level looks like a quadtree of translated windows in the final image. As shown in FIG. 10, moving from left to right shows the effects of the controllable jitter process on successively finer resolution levels (assuming no correction is applied).

As shown in FIG. 10, for a first texture image 1000 at the coarsest level, the applied controllable jitter process yields an effect that the texture image 1000 is divided into four equal areas. For a second texture image 1010 at a finer resolution level, the effect of jitter is that the image 1010 is divided into sixteen equal areas. Similarly, a third texture image 1020 at an even finer resolution level having the applied jitter process yields an effect that the image 1020 is divided into sixty-four equal areas. And a fourth texture image 1030 at the finest resolution level having jitter applied gives the effect of the image 1030 being divided into two-hundred fifty-six equal areas.

Sub-Pass Correction

The sub-pass correction process takes the jittered pixel coordinates and alters them to recreate neighborhoods similar to those in the exemplar. Because the output pixels cannot consider their simultaneously corrected neighbors, several passes of neighborhood matching are necessary at each level to obtain good results. Generally, two correction passes are performed, with each correction pass divided into a number of correction sub-passes.

Texture variation is introduced by the jitter process. Having some variation is desirable to avoid repeating the same regular patterns from the exemplar. However, variation that breaks the visual quality of the texture is generally not desirable. The correction process compares neighborhoods of each synthesized pixel with neighborhoods of the exemplar, and modifies the synthesized pixels so as to recreate synthesized neighborhoods that are compatible with the exemplar content.

Current correction processes correct all pixels simultaneously. One problem with this technique, however, is that the pixels are corrected according to neighborhoods that are also changing. This may lead to slow convergence of pixel colors, or even to cyclic behavior. Dividing the correction process into a series or sequence of sub-passes achieves better results for the same or less amount of work.

Figure 11:
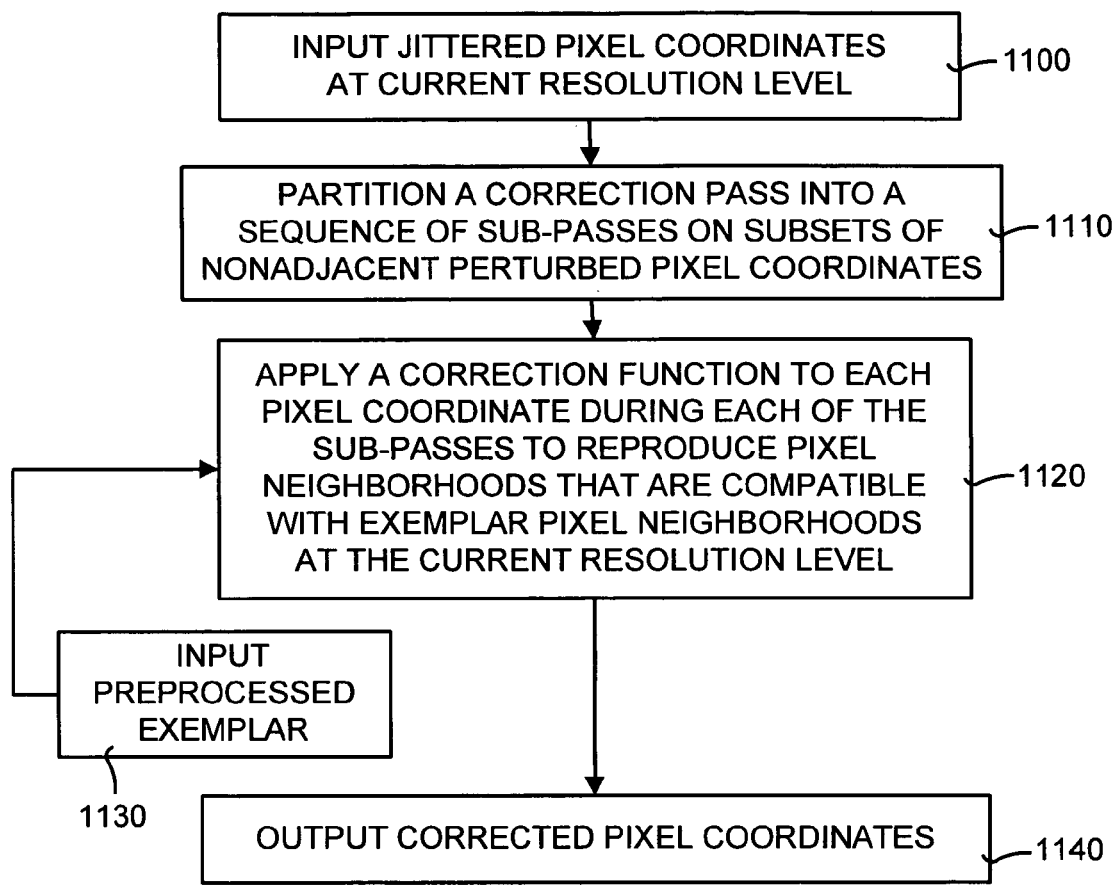
FIG. 11 is a detailed flow diagram illustrating the sub-pass correction process.

FIG. 11 is a detailed flow diagram illustrating the sub-pass correction process. The sub-pass correction process begins by receiving as input jittered (or perturbed) pixel coordinates at a current resolution level (box 1100). Next, a correction pass is partitioned or divided into a sequence or series of sub-passes (box 1110). Preferably, these sub-passes are performed on subsets of nonadjacent perturbed pixel coordinates.

A correction function then is applied to each pixel coordinate during each of the correction sub-passes (box 1120). A preprocessed exemplar is input to aid in the sub-pass correction process (box 1130). Each of these correction sub-passes reproduces pixel neighborhoods that are compatible with exemplar pixel neighborhoods at the current resolution level.

The output are corrected synthesized pixel coordinates at the current resolution level (box 1140). As shown in FIG. 3, these pixel coordinates can be used as input to another iteration of the parallel texture synthesis process or to generate a synthesized texture.

The correction function applied to each pixel coordinate during each of the correction sub-passes can be any correction technique that examines a neighborhood of a currently synthesized image. This type of neighborhood-matching texture synthesis correction techniques that work on a per-pixel basis are well known by those having ordinary skill in the art. The techniques input an exemplar, examine a neighborhood of each synthesized pixel to find a closest matching neighborhood in the exemplar. In other words, a pixel in a synthesized texture is obtained, and for each neighborhood of the pixel in the synthesized texture the technique looks a pixel neighborhoods in the exemplar that best matches the neighborhoods of the pixel in the synthesize texture. The exemplar pixel coordinates of the synthesized texture then are replaced with the new pixel coordinates of the best-matching exemplar neighborhood. In addition, there are many well-known techniques that may be used to accelerate this search, such as, for example, a k-coherence search, principal component analysis (PCA), and similarity sets, to name a few.

The sub-pass correction process improves results by partitioning a correction pass into a sequence of sub-passes on subsets of nonadjacent pixels. In a preferred embodiment, $s^2$ sub-passes are applied, each one processing the pixels p such that $p \mod s = (i\ j)^T, i,j \in \{0 \ldots s-1\}$, where p is the coordinates of the pixel and s is the number of divisions that are applied to each axis of the image. In other words, s describes the number of different sub-passes on each axis, where the pixels corrected at different sub-passes are interleaved. By way of example, for s=3 in 1-D, pixels 0, 3, 6, 9, and so forth, are corrected in a first sub-pass, pixels 1,4,7,10, and so forth, are corrected in a second sub-pass, and pixels 2,5,8,11, and so forth, are corrected in a third sub-pass.

In general, each sub-pass requires an input padding of two pixels, which is discussed in detail below under the heading of "Spatially Deterministic Computation". By way of example, a 5×5 neighborhood requires two more pixels in each direction. Moreover, for multiple sub-passes, this padding increases. The size of the padding depends on the sub-pass order. A preferred embodiment is a sub-pass order that minimizes the padding.

FIG. 12 illustrates an evaluation order of sub-passes for the sub-pass correction process shown in FIG. 11. The evaluation order can be represented graphically as an s×s matrix, shown in FIG. 12 for $s^2=4$. The phrase "represented as" in FIG. 12 indicates the order of the sub-passes. Different orders may be selected for the sub-passes. There are a number of factors to consider in selecting the number and order of the sub-passes. One factor is that the synthesis quality improves with more sub-passes, although not much beyond $s^2=9$. Another factor is that it is important to shuffle the sub-pass order. Also, when implemented on a GPU, each sub-pass requires a SetRenderTarge( ) call, which incurs a minimal cost. Another factor is that for spatially deterministic results, each sub-pass requires additional padding of the synthesis pyramid.

These factors present a tradeoff between performance and quality. Using two correction passes and $s^2=4$ sub-passes provides a good compromise. The following sub-pass order has been used with good results in order to reduce the necessary pyramid padding:

$$\begin{pmatrix} 1 & 4 \\ 3 & 2 \end{pmatrix}, \begin{pmatrix} 6 & 8 \\ 7 & 5 \end{pmatrix}.$$

These multiple sub-passes result in a significant improvement over existing correction techniques, as discussed below.

This preferred order includes two separate correction passes, each having four sub-passes. These two correction passes are performed successively. In other words, the second correction pass is performed on the output of the first correction pass. The first correction pass has the sub-pass order shown. The second correction pass order is the second matrix. This particular sequence of sub-passes expressed in this order, gives rise to a smaller padding region, than other orders. This was derived based on the set of dependencies from pixel to pixel. There are two correction passes, each with 4 sub-passes. The first matrix is the order of the 4 sub-passes for the first correction pass, and the second matrix is the order of the 4 sub-passes for the second correction pass. Thus, each pixel is corrected exactly twice.

In FIG. 12, the pixels are corrected in four sub-passes instead of a single correction pass. The sub-passes are applied sequentially, one after another, such that later sub-passes make use of the pixels corrected in earlier sub-passes. Within each sub-pass, the subset of pixels that are corrected are corrected in parallel.

The same set of pixels is being corrected (all the pixels in the image), but, as an example, in the first sub-pass just the red pixels are corrected. In the second sub-pass, just the green pixels are corrected, third sub-pass corrects just the blue pixels, and in the fourth sub-pass just the yellow pixels are corrected. Sub-pass two takes into account what has been corrected in sub-pass one, sub-pass three takes into account what has been corrected during sub-passes one and two, and sub-pass four takes into account what has been corrected in sub-passes one, two and three. In the end, after all four sub-passes have been performed, the same amount of work is performed as a single pass correction case.

The advantage of the sub-pass correction scheme is that, for example, as the red pixels are being corrected in the first sub-pass, all of the other pixels (green, blue and yellow) around the red pixels are staying constant. This is advantageous because there is no cyclic behavior, and other disadvantages of doing all pixels at the same time. Thus, while existing correction techniques optimize while everything is changing around them, the sub-pass correction process optimizes compared to something that is not changing. There is generally the same amount of overall computation, but at the end after all four sub-passes have been performed, the image is much better corrected. Although convergence is not guaranteed, the sub-pass correction scheme tends to behave much better than existing correction techniques.

By way of example, assume that the matrix is the pixel coordinates of the exemplar 800 shown in FIG. 8, namely [(0,0), (1,0), (0,1), (1,1)]. The term p mod S=(0,0) is the first sub-pass, $5^{th}$ sub-pass is p mod s=(1,1) (because 5 is at the bottom right of the matrix), $6^{th}$ sub-pass is p mod s=(0,0), and the $7^{th}$ sub-pass is p mod s=(0,1), and the $8^{th}$ sub-pass is p mod s=(1,0).

Each sub-pass only corrects a fraction of the pixels, and all the remaining pixels are left unchanged. For implementation on a GPU, this involves copying pixels unchanged. In the GPU, there are two buffers: (1) a source buffer containing the texture image (or source texture); and (2) the render target (which is the output buffer of the GPU rasterizer). The buffers must be different. This means that when sub-pass correction is performed, the GPU rasterizer will have to not only apply correction to the pixel corrected during the first sub-pass, but will also have to copy the unchanged pixels. Then buffers are swapped, and this buffer is used as the new source texture, fed through the GPU rasterizer, and to the buffer which is a new render target. This changing the render target is called the SetRenderTarget call. Because copying is a cheap operation, the bulk of the work is done in correcting the pixels. Thus, four sub-passes actually take only a small amount of time more than a single full pass, since the time of copying these other pixels is fairly insignificant. Moreover, in the future, there may be parallel architectures that allow reading and writing to the same buffer, in which case these correction sub-passes would be even more efficient. There would only be one buffer needed.

Each correction sub-pass must write to a set of nonadjacent pixels, but current GPU pixel shaders do not support efficient branching on such fine granularity. Thus, in a straightforward implementation, each sub-pass would cost almost as much as a full pass. This problem is overcome in implementation on a GPU by using a quadrant packing technique to provide coherence. Quadrant packing makes the sub-pass correction process more efficient on the GPU. The way a GPU is currently organized is that it is forced to locally process all the pixels at the same time. Quadrant packing is a way to reorganize an image such that the pixels of the current image are repacked in such a way that the pixels corrected in a sub-pass are contiguous. In this way, no computation is wasted. This contiguous nature is indicated visually in FIG. 12 by the fact that the symbolic colors are contiguous, where each color symbolizes the pixels corrected in a common sub-pass.

Figure 13B:
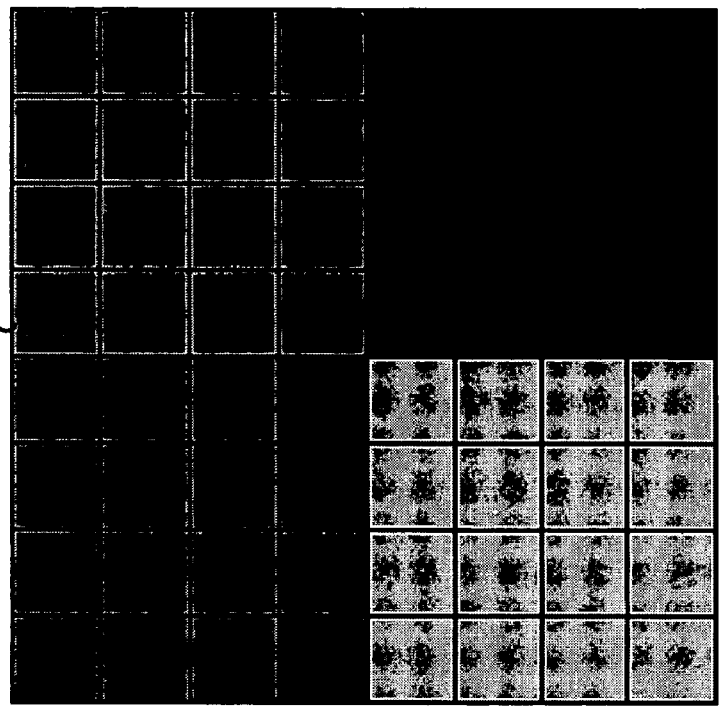
FIG. 13B illustrates a second example showing how pixels at a level are rearranged using quadrant packing such that pixels corrected in each sub-pass form a contiguous group.
Figure 13A:
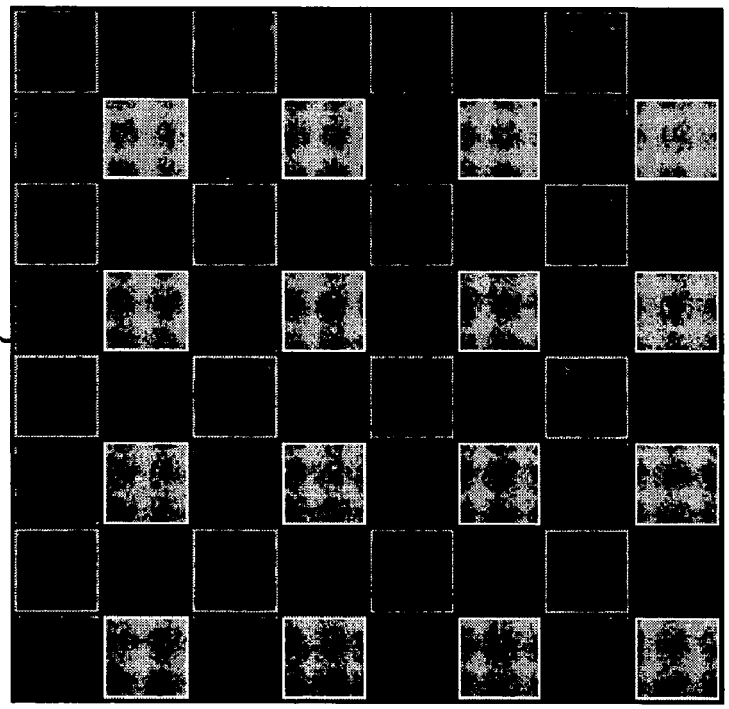
FIG. 13A illustrates a first example showing all pixels at a level whereby each pixel is colored according to the sub-pass in which it was corrected

FIG. 13A illustrates a first example 1300 showing all pixels at a level whereby each pixel is colored according to the sub-pass in which it was corrected. Thus, each color shows the pixels that were corrected in a single sub-pass. In other words, all the pixels colored blue are corrected in one sub-pass, all the pixels colored green are corrected another sub-pass, and so forth.

FIG. 13B illustrates a second example 1310 showing how all the pixels at the level are rearranged using quadrant packing such that pixels corrected in each sub-pass form a contiguous group. FIG. 13B illustrates the same set of pixels and the same set of sub-passes as FIG. 13A, but the pixels have been rearranged (or moved) such that pixels corrected in the same sub-pass (or having the same color in the FIG. 13B) are contiguous. Note that the quadrant packing provide coherence, such that similar colors are grouped together.

Figure 14:
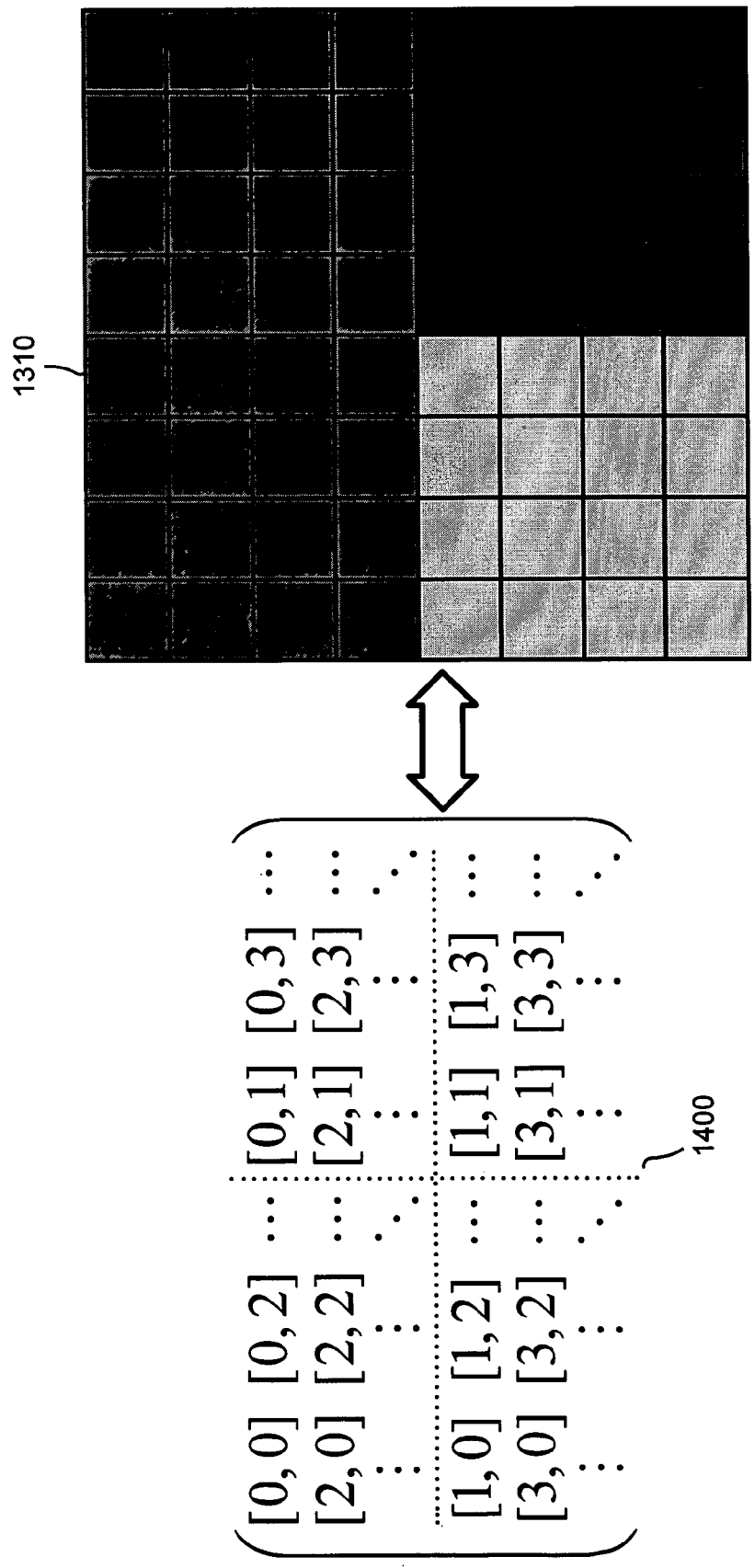
FIG. 14 illustrates how the pixel coordinates are arranged after the quadrant packing shown in FIG. 13B.

Quadrant packing reorganizes pixels according to their "mod s" location. FIG. 14 illustrates how the pixel coordinates are arranged after the quadrant packing shown in FIG. 13B. In FIG. 14, pixel coordinates 1400 are shown after quadrant packing along with using the pixels of the second example 1310 shown in FIG. 13B. In FIG. 14, $s^2=4$ and the image is stored so that each sub-pass corrects a small contiguous block of pixels (or a quadrant) while copying the remaining three quadrants. This quadrant reorganization complicates the texture reads somewhat, since the pixel neighborhoods $N_s(p)$ are no longer strictly adjacent in texture space. However, the read sequence still provides excellent texture cache locality. The end result is that all four correction sub-passes can be performed in nearly the same time as one full pass. The upsampling and jitter steps still execute efficiently as a single pass on these quadrant-packed images.

Figure 15:
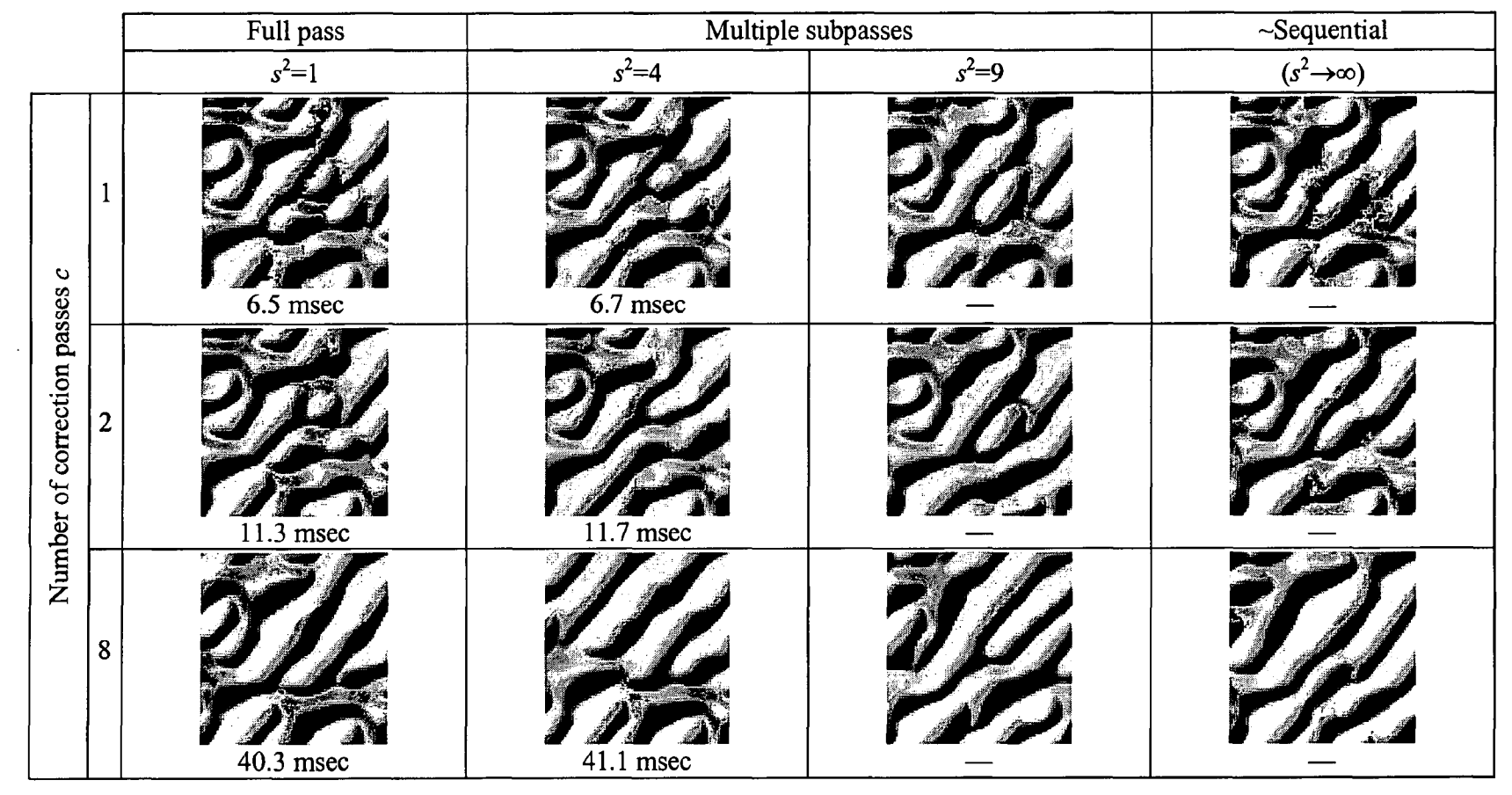

FIG. 15 illustrates a comparison between the sub-pass correction process and existing types of correction techniques. The first column corresponds to an existing correction technique in which all pixels are corrected at the same time. One problem with correcting all pixels at the same time in parallel is that it does not converge very quickly. The pixels are being corrected according to neighbors, but the neighbors are also changing at the same time. So this type of correction process does not yield the best results.

The second and third columns show results by using the sub-pass correction process implemented on a GPU. In the second column, $s^2=4$, meaning that there are 4 sub-passes. The improvement in quality for the same amount of work can be seen over the first column. In the third column, $s^2=9$, meaning that there are 9 sub-passes. It can be seen that there is only slight improvement over using 4 sub-passes. Moreover, it becomes increasingly more difficult to implement a larger number of sub-passes on the GPU. The fourth column illustrates results from using a sequential correction technique. The traditional sequential algorithm is basically a large number of sub-passes applied in scanline order. These results are actually the worst. The intuition for this is that when working sequentially, previous neighborhoods where you have been before are never revisited. In other words, there is no opportunity to correct previous mistakes. The conclusion is that it is important to shuffle the sub-pass order, as is done in a preferred sub-pass order.

This correction sub-pass technique can be applied to any parallel processing technique that applies the same process repeatedly. Any parallel process (such as a technique implemented on a GPU) that computes data from a cell using information from its neighbors can benefit from using this correction sub-pass technique. For example, assume a matrix of samples is being corrected. The correction sub-pass technique can be applied to this table of data to increase convergence.

Spatially Deterministic Computation

Deterministic synthesis requires that each correction pass start with a dilated domain (a larger set of pixels) that includes the neighborhoods of all the desired corrected pixels. In the current case of synthesizing a deterministic texture window $W_l$ at a level l, the starting point is a larger window $W_l' \supset W_l$ such that the correction of pixels in $W_l$ is influenced only by those in $W_l'$.

Recall that c=2 correction passes are applied, each consisting of $s^2=4$ sub-passes. Because the correction of each pixel depends on the previous state of pixels in its 5×5 neighborhood (at most 2 pixels away), the transitive closure of all dependencies in the complete sequence of sub-passes extends at most $2cs^2=16$ pixels. Therefore, it is sufficient that window $W_l'$ have a border padding of 16 pixels on all sides of window $W_l$. In fact, for a specific ordering of sub-passes, this border only requires 10 and 11 pixels on the left/right and top/bottom respectively.

The window $W_l'$ is created by upsampling and jittering a smaller (half-size) window $W_{l-1}$ at the next coarser level. The padding process is thus repeated iteratively until reaching $W_0'$. FIG. 5 illustrates the resulting padded pyramid, in which $W_l$ and $W_l$ are identified by the outer boundaries and the non-hazy pixels respectively. For comparison, the overlaid yellow squares show a pyramid without padding. The following table lists the padded window sizes required at each level to synthesize various windows.

| Dim. of desired window $w_L =$ | Dimension of padded window at each level | | | | | | | | |
|---|---|---|---|---|---|---|---|---|---|
| $w_8$ | $w_0'$ | $w_1'$ | $w_2'$ | $w_3'$ | $w_4'$ | $w_5'$ | $w_6'$ | $w_7'$ | $w_8'$ |
| 256 | 45 | 46 | 48 | 52 | 59 | 74 | 103 | 161 | 278 |
| 1 | 44 | 44 | 44 | 44 | 43 | 42 | 39 | 34 | 24 |

When panning through a texture image, a pre-fetch border of 4 pixels is maintained around the windows of all resolution levels to reduce the number of updates. Just two strips of texture exposed at the boundaries are incrementally computed.

Synthesis Control

As mentioned above, the jitter is controllable, either by a user or automatically. The parallel texture synthesis process includes a variety of controls. The jitter or perturbation controls will now be discussed.

Multi-scale Randomness Control

Figure 16:
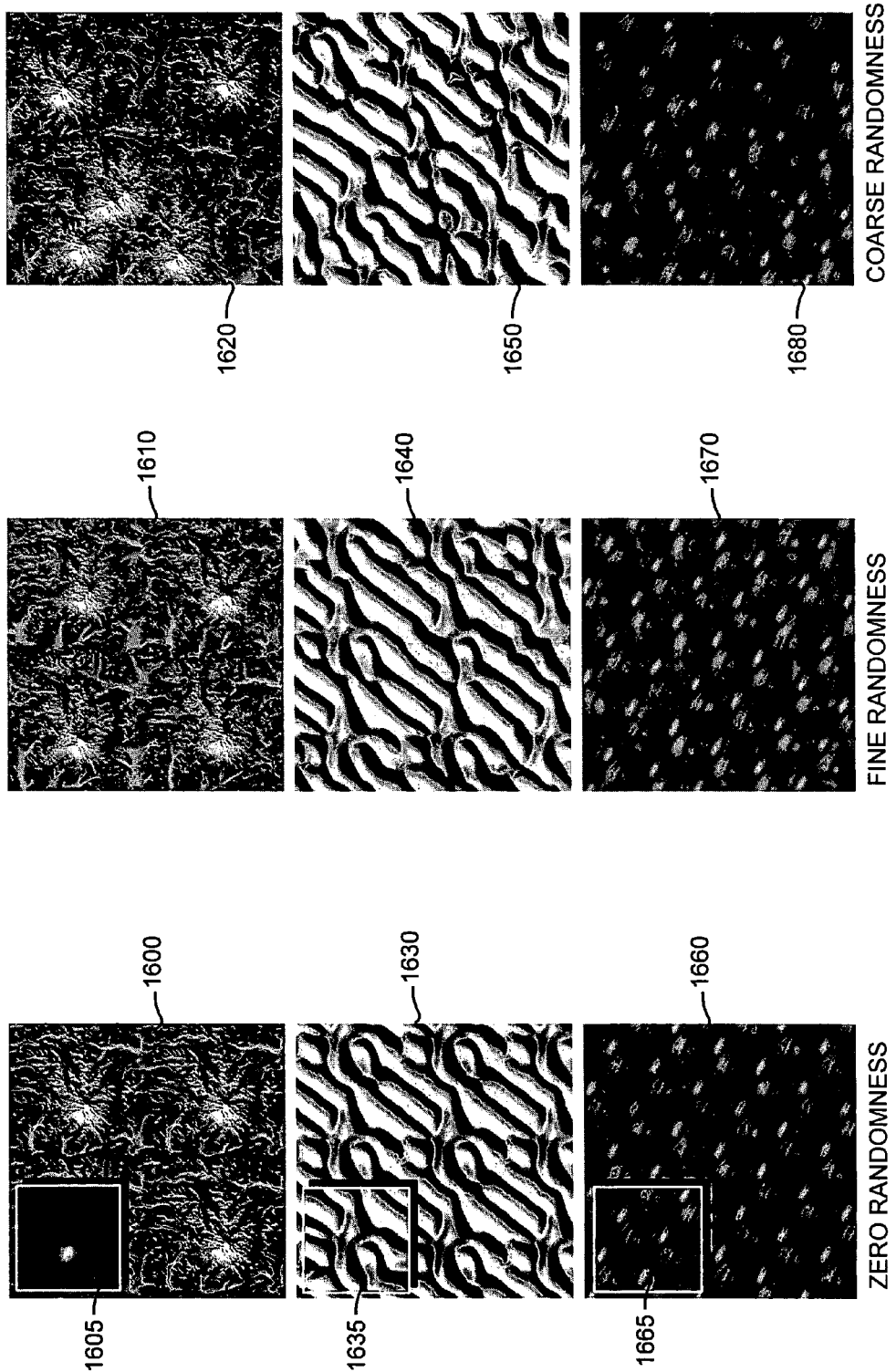
FIG. 16 illustrates examples of multi-scale randomness control.

FIG. 16 illustrates examples of multi-scale randomness control. The first column shows results for zero randomness, the middle column shows results for fine randomness, and the third column shows results for coarse randomness. For the elevation map in the top row, a first texture image 1600 has no randomness applied. The smaller inset image is a first exemplar 1605 for the first row of images. For the second texture image 1610, note how fine-scale randomness alters the mountains in place. For the third texture image 1620, note how coarse-scale randomness displaces identical copies (the elevation map is shaded after synthesis for easier visualization).

Similar results can be seen the middle and bottom rows, which show results for two different images. Specifically, in the middle row, a fourth texture image 1630 has zero randomness applied, and the smaller inset image is a second exemplar 1635 for the second row of images. A fifth texture image 1640 has fine randomness applied, and a sixth texture image 1650 has coarse randomness applied. For the bottom row, a seventh texture image 1660 used zero randomness, and the smaller inset image is a third exemplar for the third row of images. An eighth texture image 1670 used fine randomness, and a ninth texture image 1680 used coarse randomness.

It should be noted that the introduction of coarse-scale jitter removes visible repetitive patterns at a large scale. In contrast, texture tiling schemes behave poorly on non-homogeneous textures (such as texture that contain features like mountains) since the features then have "quantized" locations that are obvious when viewed from afar.

The randomness parameters, $r_l$, in equation (2), set the jitter amplitude at each level and thus provide a form of "spectral variation control". Adjusting the parameters, $r_l$, scales the magnitude of the jitter at each resolution level. If $r_l$, is large, the jitter magnitude is magnified and the features move much more. If $r_l$ is zero at every resolution level, then a periodic tiling effect is obtained.

Figure 17:
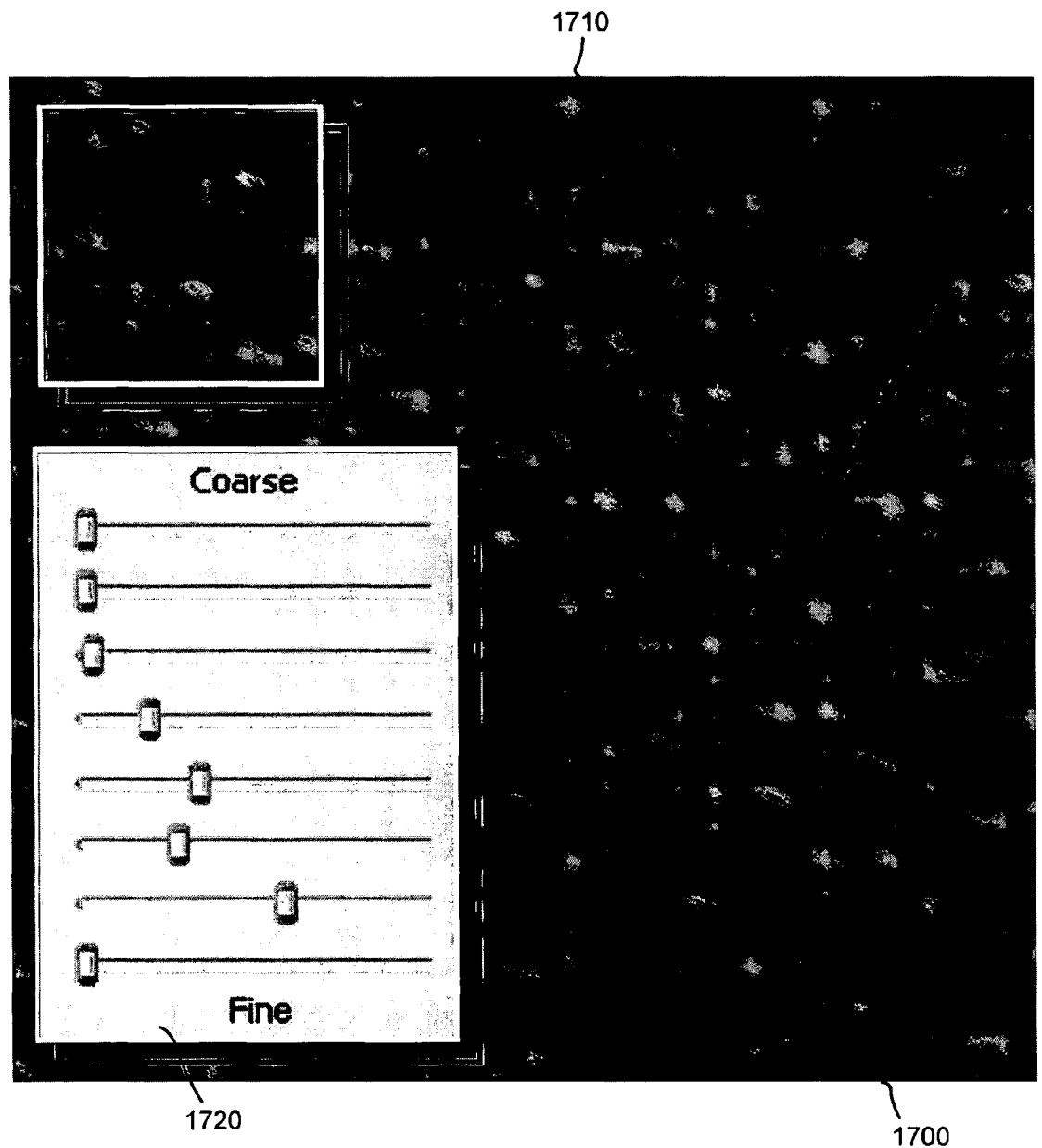
FIG. 17 illustrates an example of a user interface to control multi-scale randomness as shown in FIG. 16.

In one embodiment, these parameters are adjustable through a user interface having a set of sliders. FIG. 17 illustrates an example of a user interface 1700 to control multi-scale randomness as shown in FIG. 16. The feedback of real-time evaluation lets the parameters be chosen easily and quickly for each exemplar 1710.

Referring back to FIG. 16, the columns show what happens as $r_l$ is modified. The left column is zero jitter at all levels. The middle column is jitter at the finest levels. In the top row, it can be seen that the mountains are different even though they are in the same place, because there is a slight randomness. The ripple pattern in the second row is slightly different. Even though there is a tile-like structure, each one has a slight variation. In the bottom row, there is still a periodic structure that is slightly different. The right column is the coarse jitter, which causes the periodicity of the coarse structure to be completely broken up. In the top row, the mountains are in different locations. In the middle row, the ripple pattern completely loses its periodicity.

It should be noted that although FIG. 16 shows the jitter at two distinct scales, in reality there is a continuous amount of jitter, represented by a set of sliders 1720 contained in the user interface 1700. In particular, the set of sliders 1720 has one slider for each scale of synthesis. Thus, even though there is a discrete set of scales (hence a finite number of sliders), the jitter amplitude adjusted by each slider can be continuously adjusted.

Spatial Modulation Over Source Exemplar

Spatial modulation means that amplitude of an object is controlled as a function of where it is in the source space. Here, the variation is modulated depending on the location of the current coordinate is in the exemplar. By way of example, assume that texture synthesis is being performed and a current pixel which has a value of (2,2) in the exemplar is being examined. Further, assume that the pixel is part of a flower, and it is desirable to ensure that the flower does not have too many variations. This means it is desirable to keep the flower intact during the synthesis process. Based on the current coordinate (2,2), a separate map ($R_E$) can be generated and a mask can be painted on the map such that variation is not introduced over the region of the exemplar where the flower is located. Based on this coordinate, the map $R_E$ can be used to scale the value of the jitter vector by the source mask. Since the coordinate is inside the flower, the value (0,0) is stored everywhere in the mask. Thus, inside the mask no variation is introduced by the synthesis process.

Figure 18:
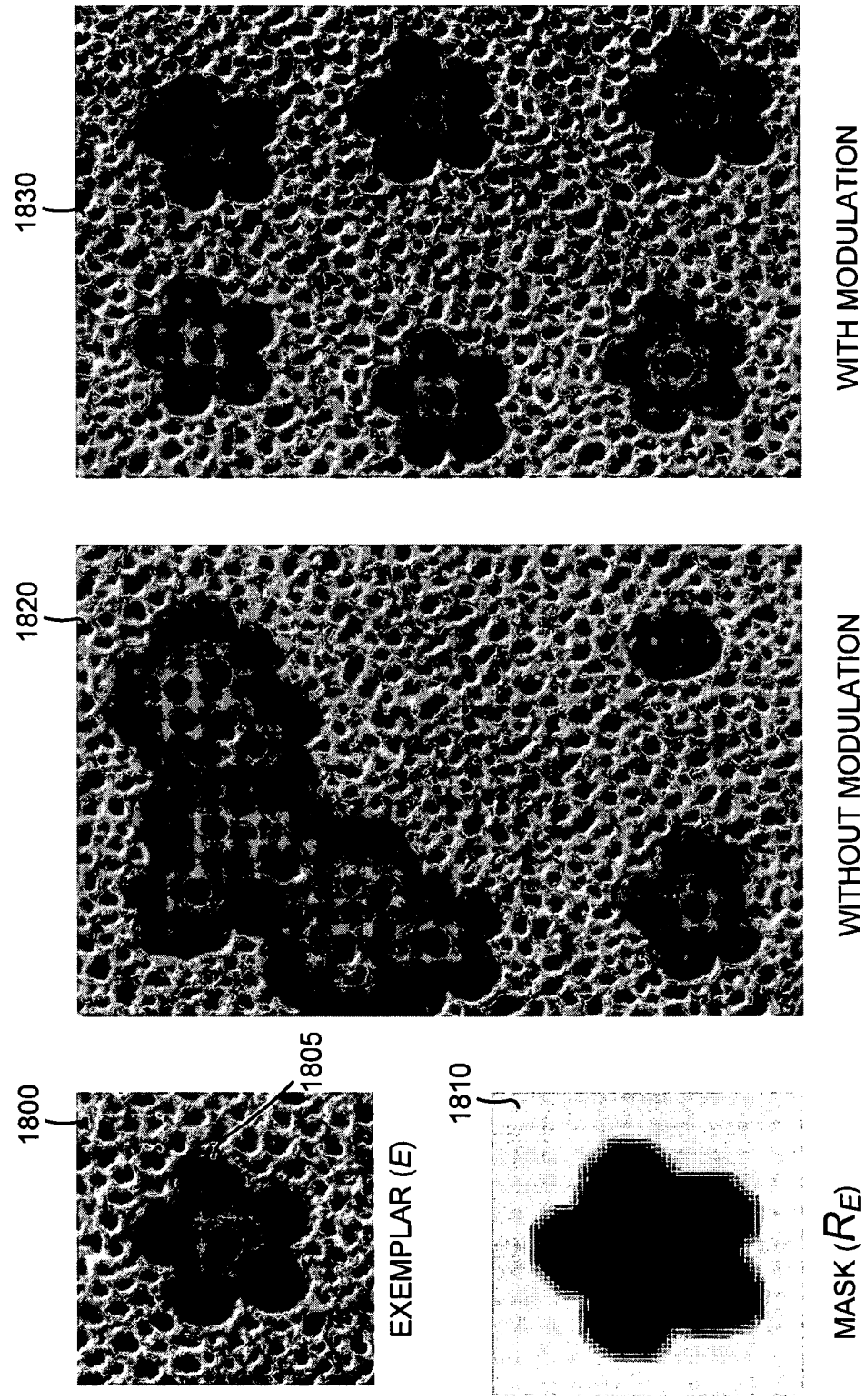
FIG. 18 illustrates the effects of exemplar-space spatial modulation on a texture image.

FIG. 18 illustrates the effects of exemplar-space spatial modulation on a texture image. As shown in FIG. 18, an exemplar 1800 includes a flower 1805 in the middle. A mask 1810 is applied to the exemplar 1800. There is one mask per level. As can be seen from a first texture image 1820, without modulation the flower is completely destroyed. On other hand, as can be seen from a second texture image 1830, with modulation the flower is kept intact. Thus, spatial modulation changes the magnitude of the jitter vector based on a location in the exemplar.

FIG. 19 illustrates an example of a user interface to control spatial modulation shown in FIG. 18. A user interface can be employed to define which feature to mask. Defining which feature to mask includes using a paint feature to "paint" the mask on the exemplar. In FIG. 19, a user (not shown) is using the user interface to "paint" the letter "C" over a synthesized texture. A first image 1900 illustrates the user interface while the user is painting the "C". A second image 1910 illustrate the user interface after the user has finished. The resulting synthesized textures are shown in the bottom row. Specifically, a first synthesized texture 1920 shows the results of the user having partially painted the "C". Moreover a second synthesized texture 1930 shows the results of the user having finished painting the "C".

The amount of randomness introduced in different parts of the exemplar can be controlled by painting a randomness field $R_E$ above it using the user interface, as shown in FIG. 19. From $R_E$ a mipmap pyramid $R_{E_j}[u]$ is created where, in a preferred embodiment, the mipmap rule is to assign each node the minimum randomness of its children. Then, jitter is modulated by the value of the randomness field $R_E$ at the current exemplar location:

$$J_l(p) = \left\lfloor \mathcal{H}(p) h_l r_l R_{E_l}[S_l[p]] + \begin{pmatrix} .5 \\ .5 \end{pmatrix} \right\rfloor. \quad (4)$$

Spatial modulation is most useful for preserving the integrity of selected texture elements in non-stationary textures, as shown in FIG. 18.

The randomness field $R_E$ serves a purpose similar to that of a binary texton mask. A texton mask is well known to those having ordinary skill in the art. One difference, however, is that techniques that use a binary texton mask first synthesize the texton mask over a surface and use it as a prior for subsequent color synthesis. Unfortunately, the larger neighborhoods necessary for good texton mask synthesis are currently an obstacle for real-time implementation. This is because their results require tens of minutes of CPU time.

Spatial Modulation over Output

The user can also paint a randomness field $R_S$ above the output image S to spatially adjust texture variation over the synthesized range. This may be used for instance to roughen a surface pattern in areas of wear or damage. In other words, instead of painting over the exemplar, a user paints over the output domain. For example, suppose that there is an output that is be synthesized, and additional variation is desired at a certain region. The parallel texture synthesis method allows a user to paint that region for more variation. Each pixel in the output is examined and jitter magnitude is scaled by the magnitude stored in the output mask ($R_S$). This is scaling of the jitter variation occurs in the output space rather than in the exemplar space. Thus, an overlay layer is painted on the output, were $R_S$ is the mask being painted.

Figure 20:
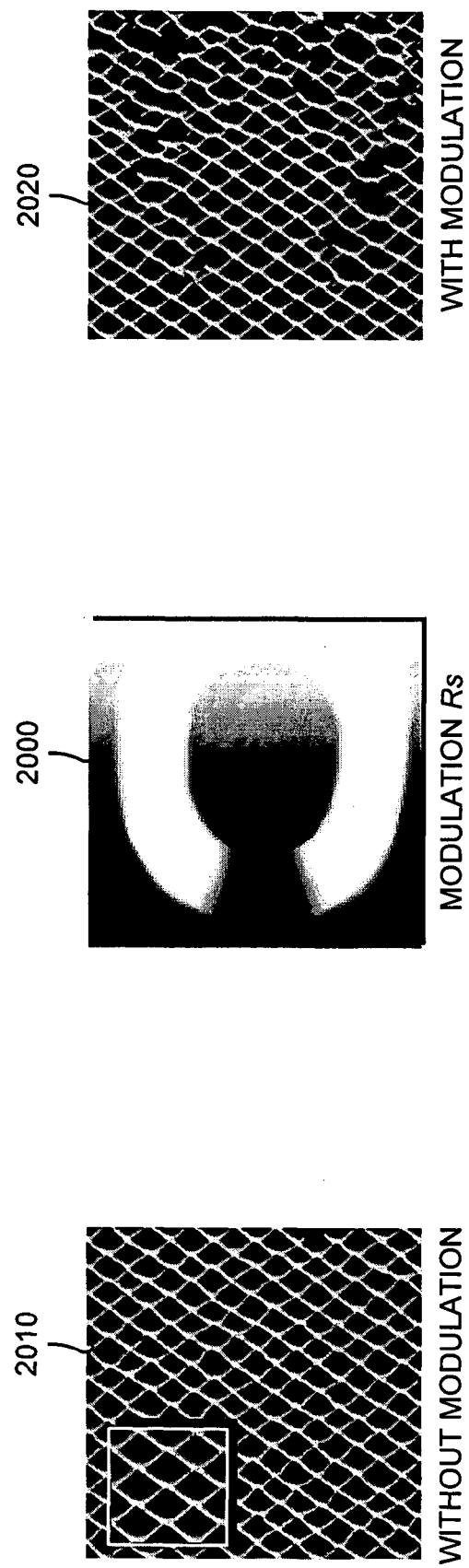
FIG. 20 is a block diagram illustrating the effect of using a spatial modulation control mask over output space.

With spatial modulation over the output, a mask is being painted over a portion of the output image to indicate which part of the output image that a user wants to achieve variation on. The mask can be referred to as a control mask. FIG. 20 is a block diagram illustrating the effect of using a spatial modulation control mask over output space. As shown in FIG. 20, a control mask 2000 is applied to a first texture image 2010. The first texture image 2010 shows the result when no modulation is applied. When the control mask 2000 is applied to the first texture image 2010, the result is the second texture 2020 which shows the effect of the user-specified spatial modulation using the control mask 2000.

In FIG. 20, an overlay is defined on output image, S, to obtain an output mask $R_S$. The jitter vectors are scaled based the output mask. A mask can be painted that varies from black (r=0) to white (r=1) and all grays in between. At black, there is no jitter or variation at all, and white there is full jitter selected by user. Thus, r=1 means that the full jitter selected is applied, r=0 means none is applied, and anywhere between 0 and 1 means that that percentage of the jitter is applied in that region.

Given the painted image $R_S$, hardware can automatically create and access a mipmap pyramid $R_{S_j}[p]$. The jitter is modulated using the equation:

$$J_l(p) = \left\lfloor \mathcal{H}(p) h_l r_l R_{S_l}[p] + \begin{pmatrix} .5 \\ .5 \end{pmatrix} \right\rfloor. \quad (5)$$

In the previous discussion, the masks $R_E$ and $R_S$ were specified by the user through a painting interface. However, these masks can also be any stored image or any image that is procedurally described. The masks could even be the result of another texture synthesis process.

Feature Drag-and-Drop

One exciting feature of the parallel texture synthesis system and method is the drag-and-drop interface. The drag-and-drop feature locally overrides jitter to explicitly position texture features. For example, the user can fine tune the locations of buildings in a cityscape or relocate mountains in a terrain. Also, decals can be instanced at particular locations, such as bullet impacts on a wall.

The drag-and-drop feature is a control that is done through the jitter. However, in this case, the jitter is replaced by some other function input from the user interface or generated by a procedure. This allows the user to drag a part of the exemplar and make sure that part of exemplar is going to appear at a specific location.

The general idea is that a user can override the synthesized exemplar coordinates. By way of example, suppose that a user wants pixel (1,1) to appear at a certain location. The system and method disregard the number that has been generated at that location and force the value to be (1,1). The pixel (1,1) then will appear.

One difficulty to be overcome is how to visually blend the surrounding values with the explicitly overridden values. By "visually blend", it is meant that the synthesis correction process should make the synthesized texture near the constraint still look compatible with the exemplar content. The approach the parallel texture synthesis system uses is that during the synthesis circular areas are constrained in the output. This circular region is called a "constraint region". In the constraint region, during the controllable jitter process the current synthesized values are replaced by the explicitly specified coordinates, thereby copying a feature of the exemplar directly into the output image. At coarse resolution levels, the circular region is large, and at finer resolution levels the circular region becomes smaller. At coarse resolution, a very large area is constrained.

Figure 21:
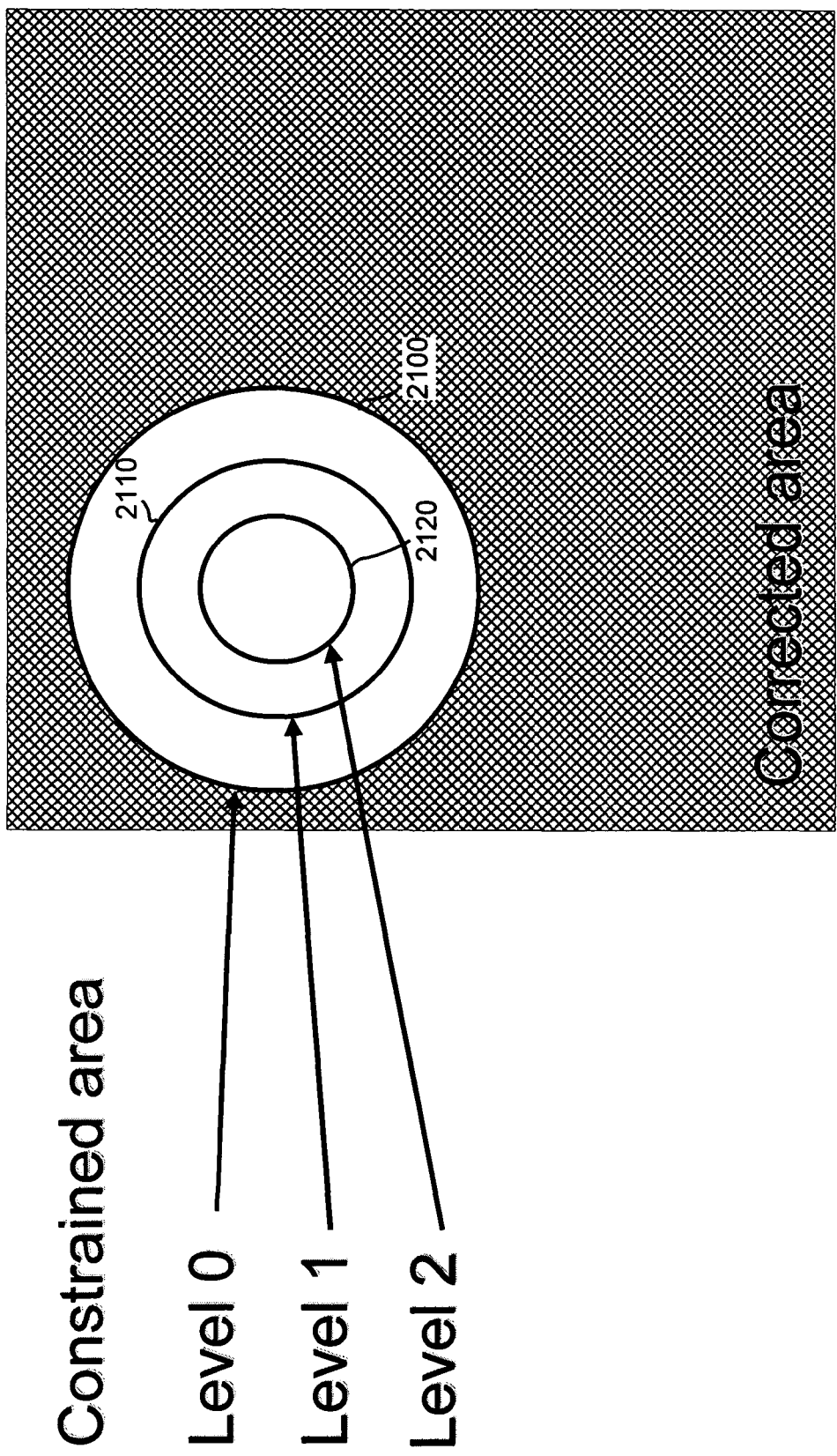
FIG. 21 illustrates an example of constraint regions for different resolution levels.

FIG. 21 illustrates an example of constraint regions for different resolution levels. As shown in FIG. 21, at a coarsest resolution level, level 0, a first constraint region 2100 is the largest. At a finer resolution level, level 1, a second constraint region 2110 is smaller. And at the finest resolution level shown, level 2, a third constraint region 2120 is the smallest. Thus, the constraint regions become smaller at finer resolution levels.

In a user interface, the user specifies two different circles. A first circle corresponds to a constraint region at the finest level, and a second circle corresponds to a constraint region at the coarsest level. Then, an interpolation is performed between the two circles. It should be noted that other constraint regions could be defined, besides circles. Such constraint regions include ellipses, squares, or any sampled or procedurally defined shape. In addition, other interpolation methods across levels could be used.

Figure 22:
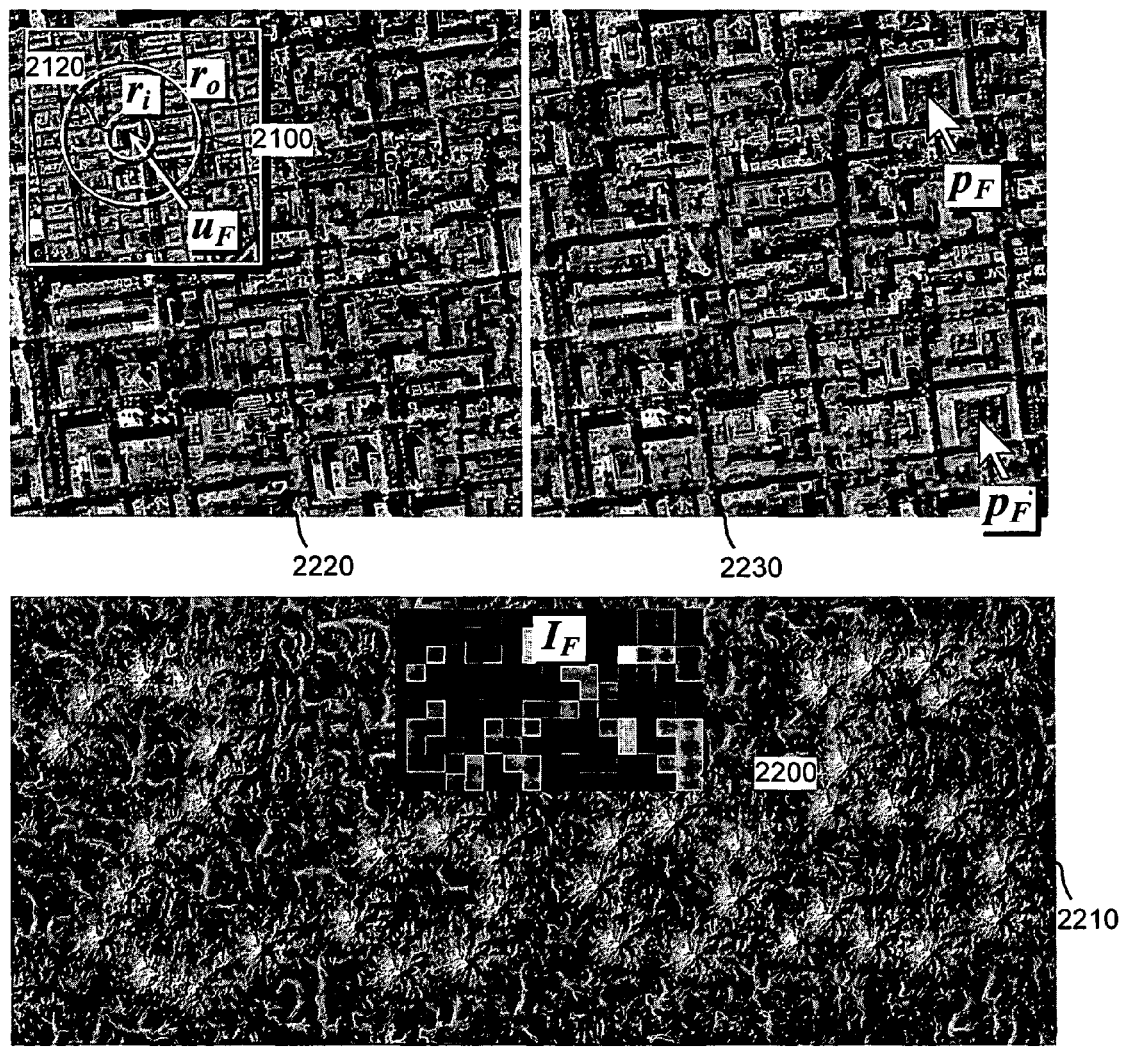
FIG. 22 illustrates an example of the drag-and-drop interface and its results.

FIG. 22 illustrates an example of the drag-and-drop interface and its results. A coarse 20×10 pixel image 2200, $1_F$, is used to encode the mountain positions for the 1280×560 pixel synthesized terrain 2210, which is then magnified to define a 19,000×8,300 pixel landscape. As shown in FIG. 22, the phrase "2005" is being formed in the synthesize terrain 2210 out of the mountains. The location of the mountains was specified by the user using the drag-and-drop feature. All of these locations are encoded in the image 2200 $l_F$, where $l_F$ is a coarse image at the same resolution as level 1 (the next-coarsest level) in the parallel synthesis system. Each color represents the location and radii of that feature. Thus, a 20×10 pixel image is all that is needed to encoded all the locations of the features in a large landscape, where the landscape is 19,000×8,300 pixels. This is much smaller than can be achieved by storing all of the pixels. The first image 2220 at the upper left corner of FIG. 22 represents the user interface before the drag-and-drop process has taken effect. The second image 2230 at the upper right corner of FIG. 22 represent the user interface after the drag-and-drop process.

In FIG. 22, the term $u_F$ is the location of what is being dragged from the exemplar. The term, $r_i$, is the inner radius (or the radius at the fine resolution), which corresponds to the third constraint region 2120 shown in FIG. 21, and the term, $r_o$, is the coarse radius (or the radius of the constraint at the coarse resolution), which corresponds to the first constraint region 2100 shown in FIG. 21. The term $p_F$ is where the user wants to drag the feature to appear in the output. The purpose is to drag the area of radius $r_i$, around $u_F$ at the location $p_F$ into the output texture. At the higher resolution levels, the radius gets continually smaller. With the user interface, the user clicks on $u_F$ and drags the output to $p_F$. The $r_i$ and $r_o$ have default values, but alternatively can be selected by the user.

The important thing is that if feature parameters are stored in a coarse image, memory is saved. As shown in FIG. 22, all that needs to be stored is 20×10 pixel image and that will define the drag-and-drop in a 19,000×8,300 pixel output texture. Or, another way to say it is that when the user performs a drag-and-drop operation, this operation is captured using the 20×10 pixel coarse image. This saves on memory.

Mathematically, the approach is to constrain the synthesized coordinates in a circular region of the output. Let the circle have center $p_F$ and radius $r_F$, and let $u_F$ be the desired exemplar coordinate at $p_F$. The term $S_l[p] := (u_F + (p - p_F))$ mod m then is overridden if $\|p - p_F\| < r_F$. It is important to apply this constraint across many synthesis levels, so that the surrounding texture can best correct itself to merge seamlessly. For added control and broader adaptation at coarser levels, two radii are stored, namely, the inner radius $r_i$ and the outer radius $r_o$ and interpolate the radius per-level as $r_F = r_i l/L + r_o(L-l)/L$. The user selects the feature $u_F$ by dragging from either the exemplar domain or the current synthesized image, and the dragged pointer then interactively updates $p_F$.

The parameters $u_F$, $p_F$, $r_i$, $r_o$ are stored in the square cells associated with a coarse image $l_F$ (at resolution l=1 one embodiment), similar to existing texture sprites. Unlike texture sprites, however, the synthesized features of the parallel texture synthesis system and method merge seamlessly with the surrounding texture. In addition, feature variations can be introduced by disabling the synthesis constraint at the finest resolution levels.

The drag-and-drop feature of the parallel synthesis system and method offers a number of benefits. First, the constraints are satisfied using multi-scale coherence (resulting in nearly seamless blends with the surrounding texture). Second, parallel synthesis allows arbitrary placement of multiple features. Finally, the feature positions are efficiently encoded in a sparse image.

Near-Regular Textures

Near-regular textures, which are well known in the art, are geometric structures that are approximately periodic. Some textures are near-regular in the sense that they deviate from periodic tilings in two ways: (1) their geometric structure may be only approximately periodic, and (2) their tiles may have irregular color.

The near-regular feature of the parallel texture synthesis system and method is not an interactive control, but a global control over the jitter. It is for the special case of near-regular textures. These near-regular textures look like tilings, except that either the tiles are different, or they are perturbed geometrically. For example, one can imagine a keyboard having a set of tiles, but the tiles are different because the keys have different labels on them, or a brick wall where the structure of the bricks is identical but the bricks themselves may be different. An example of a tiling that is perturbed geometrically is a wicker pattern or a woven pattern, where there are slight undulations in the regularity.

For near-regular textures, the parallel texture synthesis has a way of better approximating these types of textures by quantizing the jitter. When the jitter is controlled at the coarser levels, and blocks of texture are positioned in a continuous way, one of the issues is that, for example, with a keyboard, you can end up with displacement that breaks the element between the keys. In general, the parallel texture synthesis system and method quantizes the values so that they become periodic, and the jitter vectors jump from a location in one key to the same relative location in a different key.

This can be thought of as "snapping" the jitter. This is similar to a snap grid in a drawing application, where instead of allowing continuous motion, the drawing is snapped to a grid. In the parallel texture synthesis system and method, arbitrary jitter disallowed if the desired texture pattern is near-regular. Only jitter that moves in a set period (or multiple of the period) are allowed. This forces the jitter to be snapped on the period of the tiling.

FIG. 23 illustrates results of a near-regular texture synthesis. The white circles 2300, 2310 indicate examples of newly formed tiles. Across the top row of FIG. 23, a first exemplar 2320, a second exemplar 2330, and a third exemplar 2340 are shown. The remaining three rows illustrate texture synthesized from these exemplars 2320, 2330, 2340. In addition, the left column of FIG. 23 illustrates the synthesized textures (for the three different exemplars 2320, 2330, 2340) using quantized jitter. The right column illustrates using quantized jitter only the coarse resolution level (for the three different exemplars 2320, 2330, 2340 ). In other words, quantized jitter is used during the parallel texture synthesis process only at the coarse resolution levels, while ordinary jitter also is used during the parallel texture synthesis process, but only at the finer resolution levels (also called "fine-scale jitter"). This can be useful in several applications. For example, with a brick texture, not all bricks are exactly the same size and shape.

Figure 24:
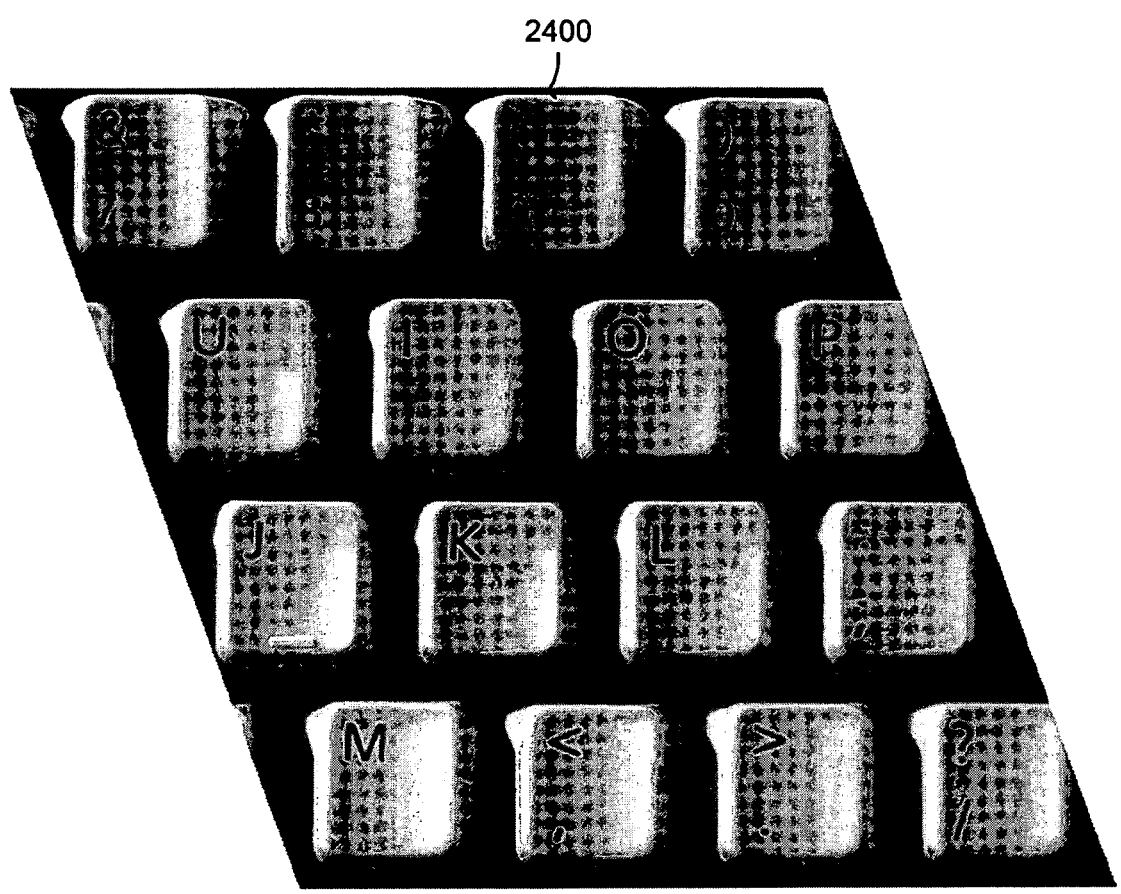
FIG. 24 is an example image of a keyboard for use by the near-regular texture synthesis shown in FIG. 23.

In mathematical terms, the near-regular synthesis scheme creates such textures as follows. Given a near-regular texture image E', the image is resampled onto an exemplar E such that its lattice structure becomes both regular and a subdivision of the unit square domain. The first goal is achieved by determining the two translation vectors representing the underlying translational lattice and warping E' into a "straightened" lattice. To satisfy the second goal, a $n_x \times n_y$ grid of lattice tiles is selected that is bounded by a parallelogram. This is mapped affinely to a unit square. As an example, a first exemplar 2320 in FIG. 31 is created from an image 2400 shown in FIG. 24. FIG. 24 is an example image 2400 of a keyboard for use by the near-regular texture synthesis shown in FIG. 23. The exemplar 2320 is treated as being toroidal in the synthesis scheme.

At runtime, tiling periodicity is maintained by quantizing each jitter coordinate as:

$$J'_{l,x}(p) = (m/n_x) \lfloor J_{l,x}(p)/(m/n_x) + 0.5 \rfloor \text{ if } h_l \geq (m/n_x) \quad (6)$$

and similarly for $J_{l,y}(p)$. The quantization is disabled on the fine levels (where spacing $h_l$ is small) to allow local geometric distortion if desired. If the neighborhood-matching correction process makes use of similarity sets, during the analysis preprocess, each similarity set also is constrained to the same quantized lattice (e.g. $u_x + i(m/n_x)$ for integer i) on levels for which $h_l \geq (m/n_x)$.

Quantizing the jitter can be expressed mathematically be taking the continuous jitter function and round it to the nearest multiple of the period $n_x$. The period $n_x$ is the spacing between repeated patterns. This is done in both the x coordinate $(n_x)$ and the y coordinate $(n_y)$. This forms a new jitter function, defined in equation (6).

In FIG. 23, the lattice parameters $(n_x, n_y)$ were respectively (4,2), (2,2), and (2,1). It should be noted that the keyboard example is not (4,4) because the rows of keys are slightly offset. Of course, the synthesized images can easily be transformed back to their original space using inverses of the affine maps. Transforming the synthesized coordinates avoids resampling.

Figure 25:
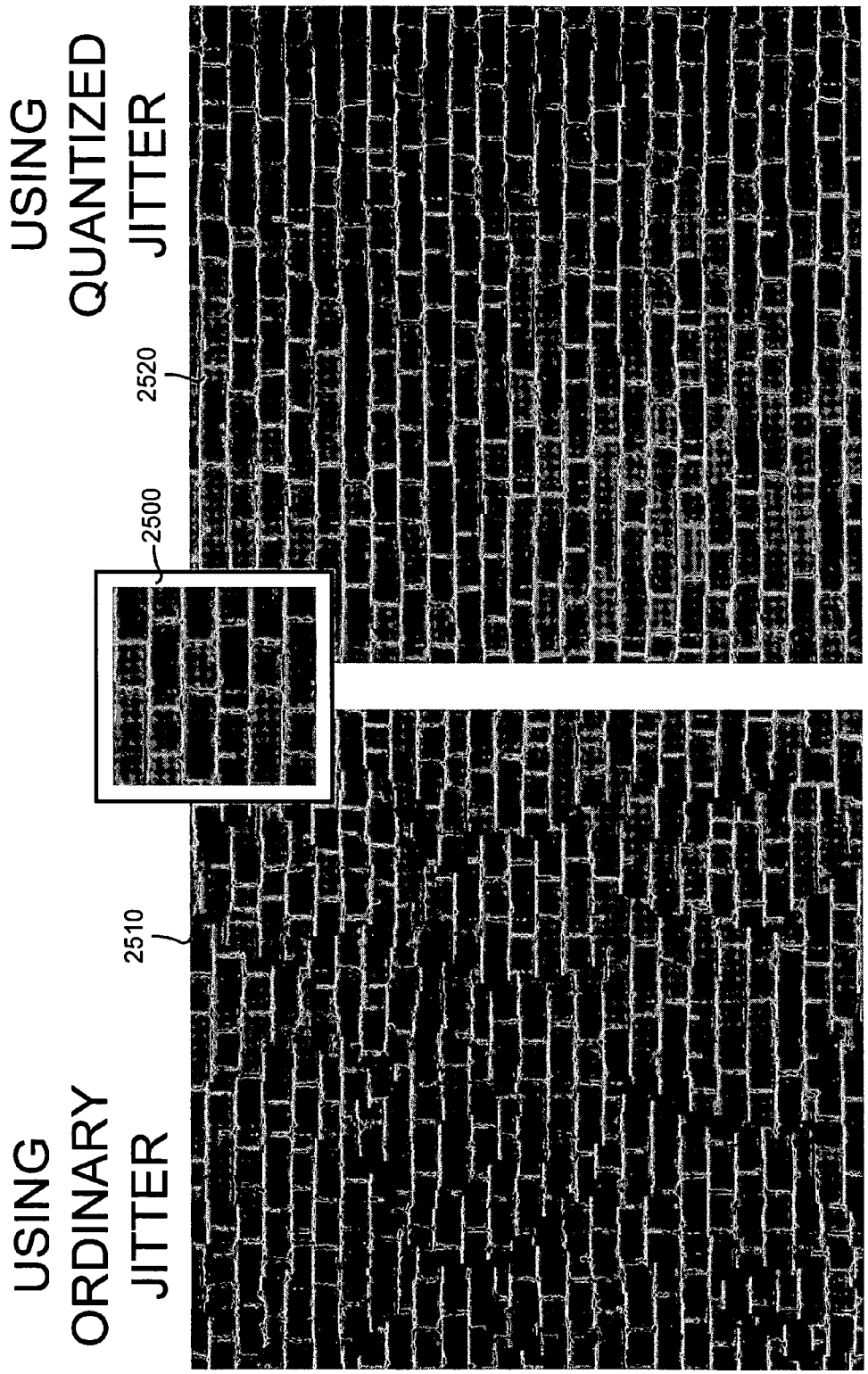
FIG. 25 illustrates results of the near-regular synthesis process and the results from using normal jitter and using quantized jitter.

FIG. 25 illustrates results of the near-regular synthesis process and the results from using normal jitter and using quantized jitter. An exemplar 2500 is used to generate a first texture image 2510 and a second texture image 2520. The first texture image 2510 has been processed using ordinary jitter at all resolution levels. On the other hand, the second texture image 2520 has been processed using quantized jitter at a coarse resolution levels and ordinary jitter at fine resolution levels. It can be seen that the near-regular process of using quantized jitter at a coarse resolution levels and ordinary jitter at fine resolution levels produces superior results.

The near-regular synthesis technique disclosed herein differs from existing technique is several ways. While existing techniques obtain color irregularity by iteratively selecting and stitching overlapping lattice tiles in scanline order, the jitter process disclosed herein allows parallel synthesis. And, by using mid-scale jitter, portions of different tiles can be combined, as evident in the creation of the new keys 2300, 2310 in FIG. 23. Finally, in existing techniques tile selection depends on the choice of a lattice anchor point, whereas the near-regular synthesis process treats the exemplar domain in a truly toroidal fashion.

VI. Working Example

The details of an exemplary working example of the parallel texture synthesis system and method now will be discussed. It should be noted that these exemplary embodiments are only a few of several ways in which the parallel texture synthesis system and method may be implemented.

The results set forth in this working example were obtained on an NVIDIA GeForce 6800 Ultra using Microsoft DirectX 9. CPU utilization was near zero. Similarity sets were used of size k=2, and c=2 correction passes, each with $s^2=4$ sub-passes. Exemplar sizes were 64×64 or 128×128.

The parallel texture synthesis system and method were implemented as a sequence of pixel shading passes on a GPU, and were able to synthesize a $256^2$ window of deterministic texture in 28 msec, or pan the window at over 200 frames/sec. A magnification technique can be used to amplify this content to fill a 1280×1024 screen in real time.

Synthesis Quality

The parallel texture synthesis technique improves on existing techniques in terms of both synthesis quality and execution speed. Multi-scale randomness was chosen manually per exemplar, requiring about an hour of interaction in total. The quality of the synthesis results is generally comparable to or better than previous neighborhood-matching schemes. This is significant since previous schemes use broader neighborhoods and larger similarity sets while the parallel texture synthesis technique uses only a one-level 5×5 neighborhood and k=2. Several factors make this possible: (1) the increased coherence of the coordinate upsampling step; and (2) the enhancement of sub-pass correction.

Synthesis Speed

The following table lists GPU execution times for a 64×64 exemplar, both for full recomputation of all pyramid levels and for incremental update when panning the fine-level window at a speed of 1 pixel/frame in both X and Y. The times are largely invariant to the particular texture content. An added benefit of GPU evaluation is that the output is written directly into video memory, thus avoiding the overhead of texture upload.

| | Average synthesis times (msec) | |
| --- | --- | --- |
| Window size | Full padded pyramid | Incremental panning |
| $128^2$ | 15 | 2.5 |
| $256^2$ | 28 | 3.6 |
| $512^2$ | 84 | 7.2 |

Mipmapping

To properly filter the synthesized texture $E_L[S_L]$ during rendering, a mipmap pyramid is computed through successive downsampling. Because the texture is being generated at runtime, an alternative was used. Namely, intermediate-resolution synthesized images were used. Of course, these were only approximations since they ignore subsequent jitter and correction, but it was found that they often are adequate.

Toroidal Synthesis

In one scenario, a goal of the parallel texture synthesis system and method is to produce textures that can be attached seamlessly. In another scenario, an infinite extent of texture can be produced. In the first scenario, for the texture to be toroidal, the left edge corresponds to the right edge, and the top edge corresponds to the bottom edge. Thus, if you put them side-by-side, there will be no seams.

A torus is a doughnut-shaped 3-D structure. If you take the right and left sides of the 2-D texture and join them, then you get a cylinder. If you join the top and the bottom of the cylinder, them you form a doughnut. This is called a "toroidal domain". Has the same topology and symmetry as a torus With the parallel texture synthesis technique, the jitter specifies the final texture content. The idea of creating a toroidal texture is to make the jitter repetitive. Texture can be made toroidal just by changing the way the jitter is generated.

In order to create a toroidal image, both the pyramid padding and the quadrant packing were disabled. Then, the synthesized neighborhoods $N_{S_l}$ were evaluated toroidally. Alternatively, to retain the efficiency of quadrant packing, synthesis can be performed using a padded pyramid as before, but redefine the jitter function to be periodic using J'(p)=J(p mod n), where n is the size of the synthesized image. Unlike in sequential per-pixel algorithms, there are no special cases at the image boundaries.

GPU Implementation

The three processes of parallel texture synthesis were performed using a GPU rasterization pipeline. The upsampling and jitter processes were simple enough that they were combined into a single rasterization pass. The most challenging step was the correction step.

2-D Hash Function

One common approach to define a hash function is to fill a 1-D texture table with random numbers, and apply successive permutations through this table using the input coordinates. The parallel texture synthesis approach used a 2D 16×16 texture, and with an affine transform between permutations to further shuffle the coordinates. Note that the interaction of jitter across levels helped to hide imperfections of the hash function. Because the hash function was only evaluated once per pixel during the jitter step, it was not a bottleneck—the correction pass is by far the bottleneck.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for synthesizing texture, comprising:
    obtaining an initialization image containing pixel coordinates;
    using a general-purpose computing device having a processor to correct the pixel coordinates in a plurality of sub-passes using the initialization image and a neighborhood-matching per-pixel texture synthesis correction technique, the neighborhood-matching per-pixel texture synthesis correction technique further comprising:
        partitioning a correction pass into the plurality of sub-passes on subsets of nonadjacent pixel coordinates;
        using two separate correction passes each having four correction sub-passes in the following order to reduce pyramid padding:

$$\begin{pmatrix} 1 & 4 \\ 3 & 2 \end{pmatrix}, \begin{pmatrix} 6 & 8 \\ 7 & 5 \end{pmatrix};$$

modifying each of the subsets of nonadjacent pixel coordinates to reproduce pixel neighborhoods that are compatible with pixel neighborhoods in an exemplar by applying a correction function to each of the pixel coordinates at the current resolution level during a current correction sub-pass to obtain corrected pixel coordinates in the current correction sub-pass; and
        using the corrected pixel coordinates in sub-passes occurring later in time such that the later sub-passes make use of the corrected pixel coordinates that were corrected in sub-passes occurring earlier in time;
        wherein a plurality of the synthesized pixel coordinates is corrected in each of the plurality of sub-passes.

2. The computer-implemented method of claim 1, wherein the computer-implemented method for synthesizing texture is implemented on a parallel processor.

3. The computer-implemented method of claim 1, further comprising correcting a fraction of the pixel coordinates in each sub-pass, wherein the fraction of pixel coordinates being corrected are corrected in parallel while leaving other pixel coordinates unchanged.

4. The computer-implemented method of claim 1, further comprising:
    upsampling pixel coordinates of the initialization image to obtain synthesized pixel coordinates at a current resolution level having a higher resolution than a previous resolution level;
    jittering the synthesized pixel coordinates at the current resolution level to generate jittered pixel coordinates; and
    correcting the jittered pixel coordinates in the plurality of sub-passes.

5. The computer-implemented method of claim 1, further comprising replacing the pixel coordinates with best-matching pixel coordinates based on the plurality of correction sub-passes.

6. The computer-implemented method of claim 1, further comprising using padding that includes a dilated domain of pixels including a neighborhood of desired corrected pixels, wherein a size of the padding depends a sub-pass order.

7. The computer-implemented method of claim 1, further comprising using a quadrant packing technique during each of the plurality of correction sub-passes to reorganize the pixels such that all pixels corrected in a specific correction sub-pass are contiguous.

8. A non-transitory computer-readable medium having computer-executable instructions for performing correction of pixel coordinates, comprising:
    inputting an initialization image at a previous resolution level; upsampling pixel coordinates at the previous resolution level to generate a current resolution level having a finer resolution level than the previous resolution level;
    defining a subset of nonadjacent upsampled pixel coordinates for each correction sub-pass, the subset containing a fraction of all the upsampled pixel coordinates at a resolution level;
    correcting each of the upsampled pixel coordinates within a subset in parallel while leaving other upsampled pixel coordinates at the resolution level unchanged, correcting further comprising:
    applying a correction function to each of the upsampled pixel coordinates at the current resolution level during a current correction sub-pass to modify the pixel coordinates to reproduce pixel neighborhoods that are compatible with pixel neighborhoods in an exemplar to obtain corrected pixel coordinates in the current correction sub-pass, the correction function processing each of the pixel coordinates, p, in the current correction sub-pass according to the equation:

$$p \bmod s = (i,j)^T, i, j \in \{0 \ldots s-1\},$$

where s is a number of different sub-passes on each axis of an image and for s=3 in one-dimension, pixels 0, 3, 6, 9, are corrected in a first sub-pass, pixels 1,4,7,10, are corrected in a second sub-pass, and pixels 2,5,8,11, are corrected in a third sub-pass;

using the corrected pixel coordinates in sub-passes occurring later in time making use in later sub-passes of the corrected pixel coordinates that were corrected in sub-passes occurring earlier in time; and repeating the upsampling and sub-pass correction of pixel coordinates for successively finer resolution levels to generate the synthesized texture.

9. The non-transitory computer-readable medium of claim 8, further comprising:

jittering the upsampled pixel coordinates to obtain jittered pixel coordinates; and correcting the jittered pixel coordinates using the series of correction sub-passes.

10. The non-transitory computer-readable medium of claim 8, further comprising using a number of correction sub-passes equal to S2, where s describes a number of different sub-passes on each axis, wherein pixels corrected at different sub-passes are interleaved.

11. A computer-implemented process for correcting pixel coordinates using an exemplar, comprising:

inputting pixel coordinates obtained from the exemplar;

separating the pixel coordinates into subsets of nonadjacent pixel coordinates, wherein each of the subsets contains a fraction of the pixel coordinates;

partitioning a correction pass in a sequence of sub-passes;

using a general-purpose computing device having a processor to apply a correction function to each pixel coordinate at a current resolution level during a current correction sub-pass to modify the pixel coordinates to reproduce pixel neighborhoods that are compatible with pixel neighborhoods in the exemplar to obtain corrected pixel coordinates in the current correction sub-pass, the correction function processing each of the pixel coordinates, p, in the current correction sub-pass according to the equation:

$$p \bmod s = (i\,j)^T, i, j \in \{0 \ldots s-1\},$$

where s is a number of different sub-passes on each axis of an image, and for s=3 in one-dimension, pixels 0, 3, 6, 9, are corrected in a first sub-pass, pixels 1,4,7,10, are corrected in a second sub-pass, and pixels 2,5,8,11, are corrected in a third sub-pass; and using the corrected pixel coordinates in sub-passes occurring later in time making use in later sub-passes of the corrected pixel coordinates that were corrected in sub-passes occurring earlier in time.

12. The computer-implemented process as set forth in claim 11, further comprising applying a one of a plurality of correction sub-passes to pixel coordinates in each of the subsets corresponding to the sub-pass such that the pixel coordinates in the subset corresponding to the sub-pass are corrected in parallel while the remaining pixel coordinates are left unchanged.

13. The computer-implemented process as set forth in claim 12, further comprising selecting a sub-pass order in which the correction function is applied to each of the subsets such that a padding is minimized.

14. The computer-implemented process as set forth in claim 12, further comprising arranging pixels belonging to the same sub-pass correction subset in a contiguous manner.

* * * * *